(12) United States Patent
Akagawa et al.

(10) Patent No.: US 7,010,200 B2
(45) Date of Patent: Mar. 7, 2006

(54) LIGHT-BEAM SWITCHING/ADJUSTING APPARATUS AND MANUFACTURING METHOD THEREOF

(75) Inventors: Keiichi Akagawa, Kamakura (JP); Yoshihiko Suzuki, Funabashi (JP); Tohru Ishizuya, Tokyo (JP); Junji Suzuki, Hachioji (JP); Katsuhiko Kurumada, Kanagawa (JP); Masatoshi Kanaya, Kanagawa-ken (JP); Toshiaki Tamamura, Kanagawa (JP)

(73) Assignees: Nikon Corporation, Tokyo (JP); NTT Electronics Corporation, Tokyo (JP)

( * ) Notice: Subject to any disclaimer, the term of this patent is extended or adjusted under 35 U.S.C. 154(b) by 0 days.

(21) Appl. No.: 10/500,086

(22) PCT Filed: Dec. 12, 2002

(86) PCT No.: PCT/JP02/13003

§ 371 (c)(1),
(2), (4) Date: Jun. 24, 2004

(87) PCT Pub. No.: WO03/056380

PCT Pub. Date: Jul. 10, 2003

(65) Prior Publication Data
US 2005/0018955 A1    Jan. 27, 2005

(30) Foreign Application Priority Data
Dec. 26, 2001 (JP) .............................. 2001-395511
Sep. 27, 2002 (JP) .............................. 2002-284190

(51) Int. Cl.
*G02B 6/26* (2006.01)

(52) U.S. Cl. .......................... 385/52; 385/385; 385/14; 385/25

(58) Field of Classification Search .................. 385/52, 385/14, 15, 16, 17, 25
See application file for complete search history.

(56) References Cited

U.S. PATENT DOCUMENTS 5,587,341 A    12/1996   Masayuki et al.

(Continued)

FOREIGN PATENT DOCUMENTS

EP           03320933          5/1993

(Continued)

OTHER PUBLICATIONS

Suga, T. et al. "A new wafer-bonder of ultra-high precision using surface activated bonding (SAB) concept" 2001 Proceedings 51st.Electronic Components and Technology Conference. ECTC 2001. Orlando, FL. May 29, 2001. Proceedings of the Electronic Components and Technology Conference, New York, NY, IEEE, US vol. Conf. 51, May 29, 2001, pp. 1013-1018, SPO10547715. ISBN: 0-7803-7038-4.

(Continued)

*Primary Examiner*—Kaveh Kianni
(74) *Attorney, Agent, or Firm*—Frishauf, Holtz, Goodman & Chick, P.C.

(57) ABSTRACT

The light guide substrate 2 has mirror receiving grooves 24 and light guides. The light guides conduct light that is input into the input ports to selected output ports in accordance with the advance and retraction of the mirrors 31 with respect to the grooves 24. The actuator substrate 4 has mirrors 31 and actuators which place the mirrors 31 in a state in which the mirrors are drawn in toward the substrate 4, or a state in which the mirrors protrude from the substrate 4. The light guide substrate 2 and actuator substrate 4 are aligned using alignment marks and joined with a spacer 3 interposed so that the mirrors 31 retract from the grooves 24 when the mirrors 31 are drawn in toward the substrate 4, and so that the mirrors 31 advance into the grooves 24 when the mirrors 31 protrude from the substrate 4. This alignment is performed in a state in which all of the mirrors 31 are drawn in toward the substrate 4.

22 Claims, 15 Drawing Sheets

U.S. PATENT DOCUMENTS

| | | |
|---|---|---|
| 5,841,917 A | 11/1998 | Jungerman et al. |
| 5,960,131 A | 9/1999 | Fouquet et al. |
| 6,122,174 A | 9/2000 | Livengood et al. |
| 6,195,478 B1 * | 2/2001 | Fouquet .................. 385/17 |
| 6,320,126 B1 | 11/2001 | Eng et al. |
| 6,360,036 B1 | 3/2002 | Couillard |
| 6,404,942 B1 * | 6/2002 | Edwards et al. ............. 385/18 |
| 6,420,782 B1 | 7/2002 | Eng et al. |
| 6,445,840 B1 * | 9/2002 | Fernandez et al. ............ 385/17 |
| 6,449,406 B1 * | 9/2002 | Fan et al. .................... 385/17 |
| 6,463,190 B1 | 10/2002 | Kato et al. |
| 6,493,482 B1 * | 12/2002 | Al-hemyari et al. .......... 385/19 |
| 6,643,426 B1 * | 11/2003 | McDonald ................... 385/18 |
| 2002/0061159 A1 * | 5/2002 | Dahmani et al. ............. 385/18 |
| 2002/0181852 A1 * | 12/2002 | Husain et al. ................ 385/18 |

FOREIGN PATENT DOCUMENTS

| | | |
|---|---|---|
| EP | 0 961 150 A2 | 12/1999 |
| EP | 1 136 851 A1 | 9/2001 |
| EP | 2000123100 | 10/2001 |
| JP | 05-130038 A | 5/1993 |
| JP | 2000-258702 | 9/2000 |
| JP | 2000-258702 A | 9/2000 |
| JP | 2000-258704 | 9/2000 |
| JP | 2000-258704 A | 9/2000 |
| JP | 2001-142008 A | 5/2001 |
| JP | 2001-305472 A | 10/2001 |
| WO | 01/31973 A1 | 7/2001 |

OTHER PUBLICATIONS

Mita M. et al., "An Out-of-Plane Plolysilicon Actuator with a smooth vertical mirror or optical fiber switch application" Digest IEEE/LEOS Summer Topical Meetings, Jul. 1998, pp. 32-34, XP002936881.

* cited by examiner

LIGHT-BEAM SWITCHING/ADJUSTING APPARATUS AND MANUFACTURING METHOD THEREOF

This application is a U.S. National Phase Application under 35 USC 371 of International Application PCT/JP02/13003 filed Dec. 12, 2002.

TECHNICAL FIELD

The present invention relates to a light beam switching and adjustment device used to perform light beam light path conversion and adjustment of the amount of transmission in (for example) optical communications networks, optical switching systems or the like, and a method for manufacturing the same.

BACKGROUND ART

Light beam switching and adjustment devices used for light path conversion are necessary in optical communications systems, and in recent years, matrix light beam switching and adjustment devices used to perform light path switching among a plurality of inputs and outputs have become especially important. For example, such matrix light beam switching and adjustment devices perform actions such as the transmission of light signals from one of numerous parallel input optical fibers to one of numerous parallel output optical fibers; a light beam switching and adjustment device such as that disclosed in Japanese Patent Application Kokai No. 2001-142008 is known as a concrete example of such a device.

In such a light beam switching and adjustment device, light from optical fibers is conducted to light guides in which light paths are formed in a matrix. Micromirrors using MEMS technology (MEMS: micro-electro-mechanical systems) are disposed at the intersection points of the light paths, and light path conversion and adjustment of the amount of transmission of the light beams are performed by moving these micro-mirrors into and out of slits disposed in the light paths.

FIG. 17 shows diagrams used to illustrate an example of the construction of a conventional light beam switching and adjustment device using MEMS technology. FIG. 17(a) is a plan view of this light beam switching and adjustment device, and FIG. 17(b) is a sectional view along line A–A' in FIG. 17(a).

As is shown in FIG. 17(a), this light beam switching and adjustment device comprises first through third light guide cores 302a, 302b and 302c on a core supporting substrate 301. These light guide cores are connected to incident-side optical fibers 308 or transmission-side optical fibers 309, and slits 303 are disposed in the intersection parts of the light guide cores so that these slits cut across the light guides that intersect with each other.

Furthermore, an insertion plate supporting substrate 304 is disposed as shown in FIG. 17(b) on the upper surface region of the core supporting substrate 301 indicated by a dotted line in FIG. 17(a), and a structure is formed in which insertion plates 305 disposed on this insertion plate supporting substrate 304 are driven by an insertion plate driving mechanism 307. Furthermore, 306 indicates electrical wiring used for the electrical driving of the insertion plate driving mechanism.

The insertion plates 305 are disposed facing the upper portions of the slits 303. The insertion plates 305 are driven upward and downward by the insertion plate driving mechanism 307 so that these insertion plates 305 are inserted into or removed from the slits 303. As a result, a switching action based on the switching of the light paths of the light beams that enter the slits 303 from the optical fiber core parts 310 of the incident-side optical fibers 308, and an attenuation action based on the adjustment of the amount of transmitted light, can be accomplished.

Specifically, in a state in which the corresponding insertion plate 305 is inserted into the corresponding slit 303, the light beam that enters this slit 303 from the first light guide core 302a is reflected by the insertion plate 305, and is therefore coupled with the end surface of the second light guide core 302b. On the other hand, in a state in which this insertion plate 305 is withdrawn from the slit 303, the light beam that enters the slit 303 from the first light guide core 302a is coupled "as is" with the end surface of the facing third light guide core 302c. In this way, switching of the light paths of the light beams is performed, so that a switching action is realized.

Furthermore, if the insertion position (insertion depth) of the insertion plate 305 in the slit 303 is adjusted, an attenuation action that attenuates the intensity of the transmitted light can be realized by blocking a portion of the light beam that enters the slit 303 from the first light guide core 302a in accordance with this insertion position, and allowing the remaining light beam component to pass through so that this component is coupled with the end surface of the third light guide core 302c.

In order to realize a light beam switching and adjustment device based on the system described above, it is necessary to attach MEMS actuators and micro-mirrors manufactured on the surface of a silicon substrate or the like by a MEMS process using a silicon semiconductor process or the like to a light guide substrate manufactured by a separate process. Specifically, in the manufacture of this light beam switching and adjustment device, it is necessary to join a light guide substrate which has mirror receiving recesses and an actuator substrate which has mirrors and actuators that support and move these mirrors, after aligning the mirrors and the mirror receiving recesses.

However, in the actual performance of such alignment, it has been ascertained that this alignment is extremely difficult. Specifically, since the mirror receiving recesses are disposed at intermediate points in the light guides, it is desirable that the width of the mirror receiving recesses be set as narrow as possible in order to suppress light loss. Accordingly, an extremely high degree of precision is required in the alignment of the mirrors and mirror receiving recesses. Furthermore, if the mirrors collide with parts other than the mirror receiving recesses in the process of this alignment of the mirrors relative to the mirror receiving recesses, the mirrors are easily damaged. Accordingly, the alignment of the light guide substrate and actuator substrate is extremely difficult. Especially in cases where the number of mirrors is large, all of the mirrors must be aligned with the corresponding mirror receiving recesses; accordingly, this alignment is extremely difficult.

Furthermore, the actuators are driven in accordance with signals. In the light beam switching and adjustment device of the present invention, the device has the following special characteristic: namely, the actuator substrate is joined with the light guide substrate in the assembly process. With this as a prerequisite, in order to reduce the size of the device and to facilitate inspections and the like during the manufacturing process, it is necessary to devise the structure of the wiring and the like that is used to supply signals to the actuator substrate so that this wiring, etc., does not interfere with the assembly, and so that inspections can easily be performed by connecting temporary wiring during such inspections.

Furthermore, in such a light beam switching and adjustment device, the relative positional relationship between the insertion plates and the slits formed in the light guide cores needs to be set so that the reflection loss is minimized when the insertion plates are caused to function as reflective plates. Furthermore, in order to reduce the loss of reflected light, it is desirable that the positions of the insertion plates with respect to the slits be aligned with a precision of 1 μm or better. Moreover, in cases where the amount of attenuation of the light beams is adjusted, the insertion plates must be smoothly driven by the insertion plate driving mechanism.

In order to observe the state of high-precision alignment of the insertion plates and slits in such a light beam adjustment device, it is important to accurately monitor these relative positions and the insertion depth of the insertion plates inside the slits from the outside.

Generally, a method is used in which microscopic observation by an optical method is used to monitor the relative positional relationship between the insertion plates and the slits following the bonding of the core supporting substrate and insertion plate supporting substrate, with observation being performed using an infrared microscope in cases where the device is constructed using silicon substrates, and using a common optical microscope equipped with a visible-light light source in cases where glass substrates are used.

However, in addition to the insertion plate driving mechanism being attached to the insertion plate supporting substrate, wiring used to operate the insertion plate driving mechanism is also disposed. Accordingly, the following problem arises: namely, the presence of such constituent elements is a major obstacle to observation of the relative positional relationship between the insertion plates and the slits.

Furthermore, the following problem is also encountered: specifically, the observational magnification during microscopic observation inevitably increases according to the width of the slits and the size of the insertion plates that are the objects of observation; accordingly, the depth of field is shallow, so that it is difficult to discriminate the insertion positions of the insertion plates inside the slits.

DISCLOSURE OF THE INVENTION

The present invention was devised in order to solve the problems described above. The first object of the present invention is to provide a light beam switching and adjustment device which can be manufactured easily and with a good yield as a result of the alignment of the mirrors and mirror receiving recesses being facilitated, and a method for manufacturing this light beam switching and adjustment device. Furthermore, the second object of the present invention is to provide a light beam switching and adjustment device in which discrimination of the positional relationship between the insertion plates and the slits formed in the light guide cores, and the discrimination of the insertion positions of the insertion plates inside the slits, are easy.

The inventions used to achieve the first object described above are the following first through thirtieth inventions.

The first invention is a light beam switching and adjustment device comprising:

a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of one or more mirrors with respect to the one or more mirror receiving recesses; and an actuator substrate which has the one or more mirrors described above] and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals; which is characterized in that the light guide substrate and the actuator substrate are aligned and joined so that the first positions of the one or more mirrors are advanced positions with respect to the one or more mirror receiving recesses, and so that the second positions of the one or more mirrors are retracted positions with respect to the one or more mirror receiving recesses, first alignment marks which are used to align the light guide substrate and the actuator substrate are formed on the light guide substrate, and second alignment marks which are used to align the light guide substrate and the actuator substrate are formed on the actuator substrate.

The second invention is the first invention, which is characterized in that the first and second alignment marks can be observed by means of infrared light.

The third invention is the first or second invention, which is characterized in that the first alignment marks are formed on the first surface of the light guide substrate, the second alignment marks are formed on the first surface of the actuator substrate, and the actuator substrate has characteristics that allow the transmission of infrared light.

The fourth invention is a light beam switching and adjustment device comprising:

a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of one or more mirrors with respect to the one or more mirror receiving recesses; and an actuator substrate which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals; in which the light guide substrate and the actuator substrate are aligned and joined so that the first positions of the one or more mirrors are advanced positions with respect to the one or more mirror receiving recesses, and so that the second positions of the one or more mirrors are retracted positions with respect to the one or more mirror receiving recesses; which is characterized in that the supply of electric power to the actuator substrate is performed directly to the actuator substrate from the outside.

The fifth invention is a light beam switching and adjustment device comprising:

a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of the one or more mirrors with respect to one or more mirror receiving recesses; and an actuator substrate which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals; in which the light guide substrate and the actuator substrate are aligned and joined so that the first positions of the one or more mirrors are advanced positions with respect to the one or more mirror receiving recesses, and so that the second positions of the one or more mirrors are retracted positions with respect to the one or more mirror receiving recesses; which is characterized in that the device comprises a relay substrate which is used to relay electrical connections to the actuator substrate, the relay substrate is joined to the other surface of the actuator substrate so that a portion of this relay substrate protrudes from the actuator substrate, and the relay substrate does not cover the regions on this other surface of the actuator substrate corresponding to the second alignment marks.

The sixth invention is the fifth invention, which is characterized in that a plurality of first pads used for electrical connections are formed on the first surface of the actuator substrate, a plurality of second pads used for electrical connections are formed on the surface of the relay substrate located on the side of the actuator substrate in the portion of the relay substrate that protrudes from the actuator substrate, the plurality of first pads and plurality of second pads are respectively electrically connected to each other by bonding wires, a plurality of third pads used for electrical connections, each of which is electrically connected to one of the plurality of second pads, are formed on the relay substrate, a plurality of conductive parts which are respectively electrically connected to some of the second pads among the plurality of second pads are formed on the relay substrate, and the mutual disposition pitch of at least portions of the plurality of conductive parts is wider than the disposition pitch of the plurality of second pads and the disposition pitch of the plurality of third pads.

The seventh invention is the sixth invention, which is characterized in that the plurality of conductive parts are formed on the surface of the relay substrate located on the side of the actuator substrate in the protruding portion of the relay substrate, and the plurality of third pads are formed on the surface of the relay substrate located on the opposite side from the actuator substrate.

The eighth invention is the sixth or seventh invention, which is characterized in that the device comprises a substrate which has a plurality of lead terminals used for external connections, and the plurality of third pads and plurality of lead terminals used for external connections are respectively electrically connected to each other by bonding wires.

The ninth invention is a light beam switching and adjustment device comprising:

a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of the one or more mirrors with respect to one or more mirror receiving recesses; and an actuator substrate which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals; in which the light guide substrate and the actuator substrate are aligned and joined so that the first positions of the one or more mirrors are advanced positions with respect to the one or more mirror receiving recesses, and so that the second positions of the one or more mirrors are retracted positions with respect to the one or more mirror receiving recesses; which is characterized in that the actuator substrate comprises a plurality of feed terminals used for the electrical driving of the actuators, and one or more terminals of a first type used to perform feeding for the purpose of individually driving the actuators, and one or more terminals of a second type used to perform feeding for the purpose of collectively driving all of the actuators so that all of the one or more mirrors are positioned in the second positions, are included in the plurality of feed terminals.

The tenth invention is the ninth invention, which is characterized in that a driving circuit which drives the one or more actuators so that when signals that are used to cause respective desired optical switching operations are supplied to the terminals of the first type, these optical switching operations are performed, and so that when specified signals are supplied to the terminals of the second type, all of the one or more mirrors are positioned in the second positions, is mounted on the actuator substrate.

The eleventh invention is the ninth invention or tenth invention, which is characterized in that at least one concavo-convex portion is provided in each mirror, and the insertion depth of the mirrors in the mirror receiving recesses can be observed by using these concavo-convex portions as a focusing reference for the microscopic observation.

The twelfth invention is any of the first through eleventh inventions, which is characterized in that the light guide substrate and the actuator substrate are joined with a spacer interposed so that the second positions of the one or more mirrors are positions in which the mirrors are completely retracted from the one or more mirror receiving recesses.

The thirteenth invention is the twelfth invention, which is characterized in that the spacer is disposed so that this spacer surrounds the region in which the one or more mirrors are distributed on the actuator substrate.

The fourteenth invention is the thirteenth invention, which is characterized in that the space between the light guide substrate and actuator substrate is filled with a refractive index adjusting liquid which has a refractive index that is substantially the same as the refractive index of the core layers of the light guides so that this liquid enters the mirror receiving recesses, and the spacer forms a part of a sealing structure that seals the refractive index adjusting liquid.

The fifteenth invention is a light beam switching and adjustment device comprising:

a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of the one or more mirrors with respect to one or more mirror receiving recesses;

an actuator substrate which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals; and a relay substrate which is used to relay electrical connections to the actuator substrate; which is characterized in that the light guide substrate and the actuator substrate are aligned and joined so that the first positions of the one or more mirrors are advanced positions with respect to the one or more mirror receiving recesses, and so that the second positions of the one or more mirrors are retracted positions with respect to the one or more mirror receiving recesses, and the relay substrate is joined to the other surface of the actuator substrate so that a portion of this relay substrate protrudes from the actuator substrate.

The sixteenth invention is the fifteenth invention, which is characterized in that a plurality of first pads used for electrical connections are formed on the first surface of the actuator substrate, a plurality of second pads used for electrical connections are formed on the surface of the relay substrate located on the side of the actuator substrate in the portion of the relay substrate that protrudes from the actuator substrate, the plurality of first pads and plurality of second pads are respectively electrically connected to each other by bonding wires, and a plurality of third pads used for electrical connections, each of which is electrically connected to one of the plurality of second pads, are formed on the relay substrate.

The seventeenth invention is the fifteenth or sixteenth invention, which is characterized in that the device comprises a substrate which has a plurality of lead terminals used for external connections, and the plurality of third pads and plurality of lead terminals used for external connections are respectively electrically connected to each other by bonding wires.

The eighteenth invention is the sixteenth or seventeenth invention, which is characterized in that a plurality of conductive parts which are respectively electrically connected to some of the second pads among the plurality of second pads are formed on the relay substrate, and the mutual disposition pitch of at least portions of the plurality of conductive parts is wider than the disposition pitch of the plurality of second pads and the disposition pitch of the plurality of third pads.

The nineteenth invention is the eighteenth invention, which is characterized in that the plurality of conductive parts are formed on the surface of the relay substrate located on the side of the actuator substrate in the protruding portion of the relay substrate, and the plurality of third pads are formed on the surface of the relay substrate located on the opposite side from the actuator substrate.

The twentieth invention is the eighteenth or nineteenth invention, which is characterized in that all of the one or more mirrors are positioned in the second positions when specified signals are respectively supplied to the plurality of conductive parts.

The twenty-first invention is any of the eighteenth through twentieth inventions, which is characterized in that a driving circuit which drives the one or more actuators so that when signals that are used to cause respective desired optical switching operations are supplied to the plurality of third pads, these optical switching operations are performed, and so that when specified signals are respectively supplied to the plurality of conductive parts, all of the one or more mirrors are positioned in the second positions, is mounted on the actuator substrate.

The twenty-second invention is a light beam switching and adjustment device comprising:

a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of the one or more mirrors with respect to one or more mirror receiving recesses; and an actuator substrate which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals; which is characterized in that the light guide substrate and the actuator substrate are aligned and joined so that the first positions of the one or more mirrors are advanced positions with respect to the one or more mirror receiving recesses, and so that the second positions of the one or more mirrors are retracted positions with respect to the one or more mirror receiving recesses, and the light guide substrate and the actuator substrate are joined with a spacer interposed so that the second positions of the one or more mirrors are positions in which the mirrors are completely retracted from the one or more mirror receiving recesses.

The twenty-third invention is the twenty-second invention, which is characterized in that the spacer is disposed so that this spacer surrounds the region in which the one or more mirrors are distributed on the actuator substrate.

The twenty-fourth invention is the twenty-third invention, which is characterized in that the space between the light guide substrate and actuator substrate is filled with a refractive index adjusting liquid which has a refractive index that is substantially the same as the refractive index of the core layers of the light guides so that this liquid enters the mirror receiving recesses, and the spacer forms a part of a sealing structure that seals the refractive index adjusting liquid.

The twenty-fifth invention is a method for manufacturing a light beam switching and adjustment device comprising:

a step of preparing a light guide substrate [i] which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of the one or more mirrors with respect to one or more mirror receiving recesses, and [ii] on which first alignment marks are formed;

a step of preparing an actuator substrate [i] which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals, and [ii] on which second alignment marks are formed; and a step of aligning and joining the light guide substrate and the actuator substrate using the first and second alignment marks so that the first positions of the one or more mirrors are advanced positions with respect to the one or more mirror receiving recesses, and so that the second positions of the one or more mirrors are retracted positions with respect to the one or more mirror receiving recesses.

The twenty-sixth invention is a method for manufacturing a light beam switching and adjustment device comprising:

a step of preparing a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of one or more mirrors with respect to the one or more mirror receiving recesses;

a step of preparing an actuator substrate which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals;

a step of preparing a spacer that is joined between the light guide substrate and actuator substrate;

a spacer joining step in which the spacer is joined to either the light guide substrate or the actuator substrate; and a step which is performed following the spacer joining step, and in which the light guide substrate and the actuator substrate are aligned, and the spacer is joined to the other of the two substrates, i.e., either the light guide substrate or actuator substrate, so that the first positions of the one or more mirrors are advanced positions with respect to the one or more mirror receiving recesses, and so that the second positions of the one or more mirrors are retracted positions with respect to the one or more mirror receiving recesses; which is characterized in that when the spacer is joined between the light guide substrate and actuator substrate, the second positions of the one or more mirrors are positions in which the mirrors are completely retracted from the one or more mirror receiving recesses.

The twenty-seventh invention is the twenty-sixth invention, which is characterized in that first alignment marks are formed on the light guide substrate, second alignment marks are formed on the actuator substrate, and the alignment of the light guide substrate and the actuator substrate is performed utilizing the first and second alignment marks.

The twenty-eighth invention is any of the twenty-fifth through twenty-seventh inventions, which is characterized in that the actuators are constructed so that when absolutely no signals are supplied, the mirrors supported on these actuators return to specified positions that are farther from the first surface of the actuator substrate than the second positions, and when the light guide substrate and the actuator substrate are aligned, specified signals are applied to the actuator substrate, so that all of the one or more mirrors are positioned in the second positions.

The twenty-ninth invention is a method for manufacturing a light beam switching and adjustment device comprising:

a step of preparing a light guide substrate which has one or more input ports, a plurality of output ports, one or more mirror receiving recesses that are formed in one surface of the light guide substrate, and light guides that conduct the light that is input into the one or more input ports to selected output ports among the plurality of output ports in accordance with the advance and retraction of one or more mirrors with respect to the one or more mirror receiving recesses;

a step of preparing an actuator substrate which has the one or more mirrors and one or more actuators which are disposed in positions corresponding to the one or more mirrors so that these actuators support the corresponding mirrors, and which position these corresponding mirrors on the side of one surface of the actuator substrate in a first position that is relatively far from this surface or in a second position that is relatively close to this surface, in accordance with signals; and a step of aligning and joining the light guide substrate and the actuator substrate so that the first positions of the one or more mirrors are advanced positions with respect to the one or more mirror receiving recesses, and so that the second positions of the one or more mirrors are retracted positions with respect to the one or more mirror receiving recesses; which is characterized in that the actuators are constructed so that when absolutely no signals are supplied, the mirrors supported on these actuators return to specified positions that are farther from the first surface of the actuator substrate than the second positions, and when the light guide substrate and the actuator substrate are aligned, specified signals are applied to the actuator substrate, so that all of the one or more mirrors are positioned in the second positions.

The thirtieth invention is the twenty-eighth or twenty-ninth invention, which is characterized in that signals are supplied to the actuator substrate so that all of the one or more mirrors gradually return to the specified positions described above following the completion of the alignment between the light guide substrate and the actuator substrate.

In these first through twenty-eighth inventions, the light guides may be disposed in the form of a two-dimensional matrix, the mirror receiving recesses may be disposed so that these recesses include the positions of the intersection parts of the light guides, and the respective mirrors may be disposed so that these mirrors can advance into the respective intersection parts.

These first through thirtieth inventions make it possible to provide light beam switching and adjustment devices that can be manufactured easily and with a good yield, and manufacturing methods for the same, in accordance with the respective inventions. Furthermore, these inventions can provide light beam switching and adjustment devices that allow a reduction in the size of the device and facilitate inspections and the like in the manufacturing process. Furthermore, the matter of which of these effects is obtained by which invention will be clear from the constructions of the inventions described above and the embodiments described later.

The inventions used to achieve the second object are the following thirty-first through thirty-third inventions.

The thirty-first invention is a light beam switching and adjustment device used for the switching of the light paths of light beams or adjustment of the amount of transmitted light of light beams that are propagated through light guides by inserting and removing insertion plates into and from slits formed in these light guides, which is characterized in that the light guides and slits are disposed on a first substrate, the insertion plates are held by insertion plate driving means disposed on a second substrate, the first and second substrates are disposed so that the insertion plates can be inserted into and removed from the slits, a first region of the first substrate which contains the slits and a second region of the second substrate which is provided with the insertion plates are constructed so that these regions can transmit light of a specified wavelength, this light of a specified wavelength is caused to be incident from either the first region or second region, and the transmitted light is emitted from either the second region or first region, so that the insertion positions of the insertion plates inside the slits can be observed by microscopic observation.

The thirty-second invention is a light beam switching and adjustment device used for the switching of the light paths of light beams or adjustment of the amount of transmitted light of light beams that are propagated through light guides by inserting and removing insertion plates into and from slits formed in these light guides, which is characterized in that the light guides and slits are disposed on a first substrate, the insertion plates are held by insertion plate driving means disposed on a second substrate, the first and second substrates are disposed so that the insertion plates can be inserted into and removed from the slits, either a first region of the first substrate which contains the slits or a second region of the second substrate which is provided with the insertion plates is constructed so that this region can transmit light of a specified wavelength, this light of a specified wavelength is caused to be incident from either the first region or second region, and the reflected light is emitted from the first region or second region, so that the insertion positions of the insertion plates inside the slits can be observed by microscopic observation.

The thirty-third invention is the thirty-first or thirty-second invention, which is characterized in that at least one concavo-convex portion is provided in each of the insertion plates, and the insertion depth of the insertion plates in the slits can be observed by using these concavo-convex portions as a focusing reference for the microscopic observation.

These thirty-first and thirty-second inventions make it possible to provide a light beam switching and adjustment device in which discrimination of the positional relationship between the insertion plates and the slits disposed in the light guide cores is easy. Furthermore, in addition to this, the thirty-third invention makes it possible to provide a light beam switching and adjustment device in which discrimination of the insertion positions of the insertion plates inside the slits is easy.

BRIEF DESCRIPTION OF THE DRAWINGS

FIG. 15(a) is a plan view of this device, and FIG. 15(b) is a sectional view along line A–A' in FIG. 15(a).

FIG. 17(a) is a plan view of this light beam switching and adjustment device, and FIG. 17(b) is a sectional view along line A–A' in FIG. 17(a).

BEST MODE FOR CARRYING OUT THE INVENTION

The light beam switching and adjustment device of the present invention, and method for manufacturing the same, will be described below with reference to the figures.

Figure 1:
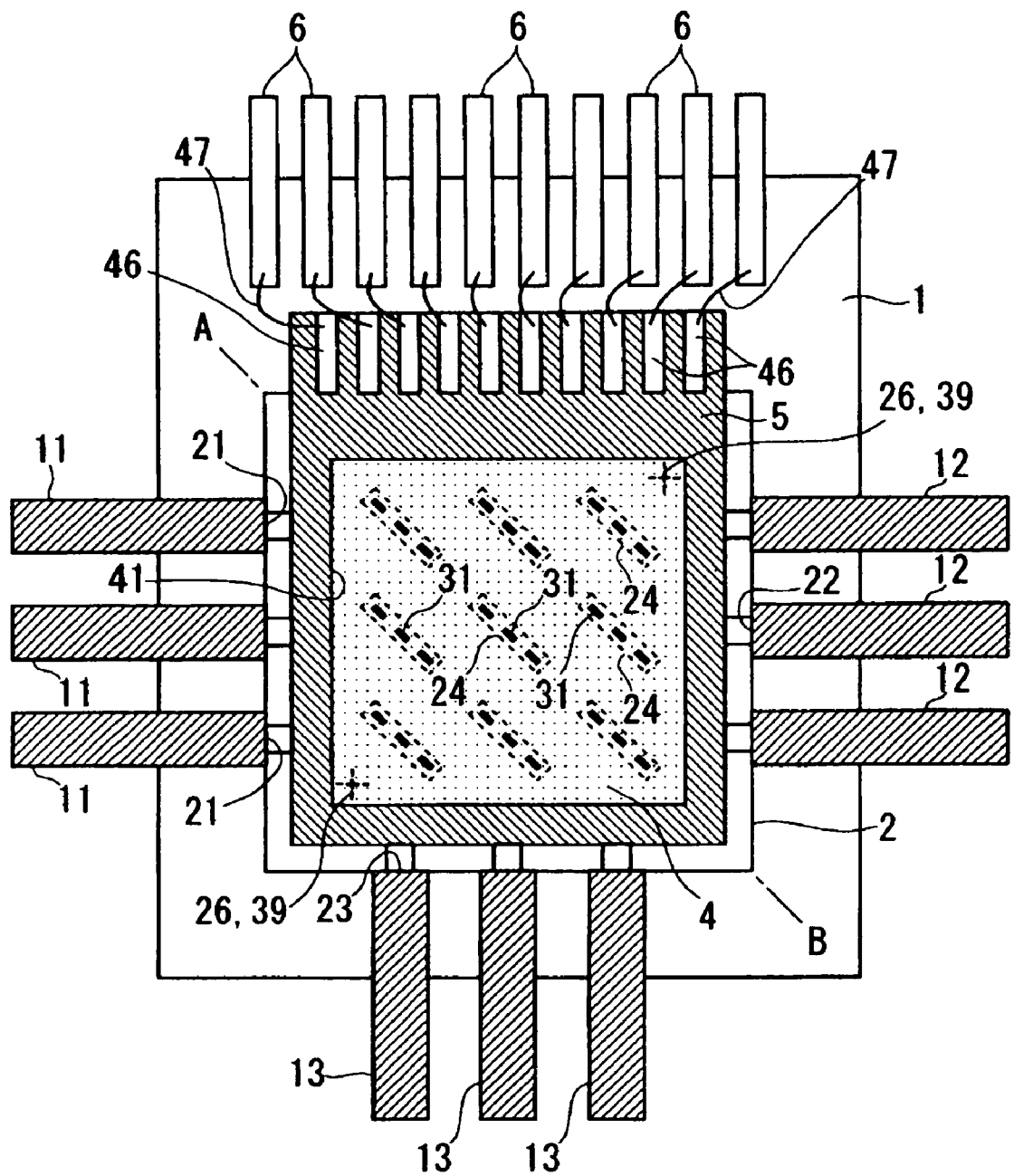
FIG. 1 is a schematic plan view which shows in model form a light beam switching and adjustment device according to one embodiment of the present invention.

FIG. 1 is a schematic plan view which shows in model form a light beam switching and adjustment device according to one embodiment of the present invention. For convenience of description, mutually perpendicular X, Y and Z axes are defined as shown in FIG. 1 (these axes are the same in figures described later). Furthermore, in FIGS. 1 through 14, the same constituent elements are labeled with the same symbols, and a description for each figure may be omitted. The surface of the light guide substrate 2 and the surface of the actuator substrate 4 are parallel to the XY plane. Furthermore, for convenience of description, the + side in the direction of the Z axis (i.e., the side toward which the arrow is oriented) will be referred to as the +Z side, and the – side in the direction of the Z axis will be referred to as the –Z side. The same is true in regard to the direction of the X axis and the direction of the Y axis.

Figure 2:
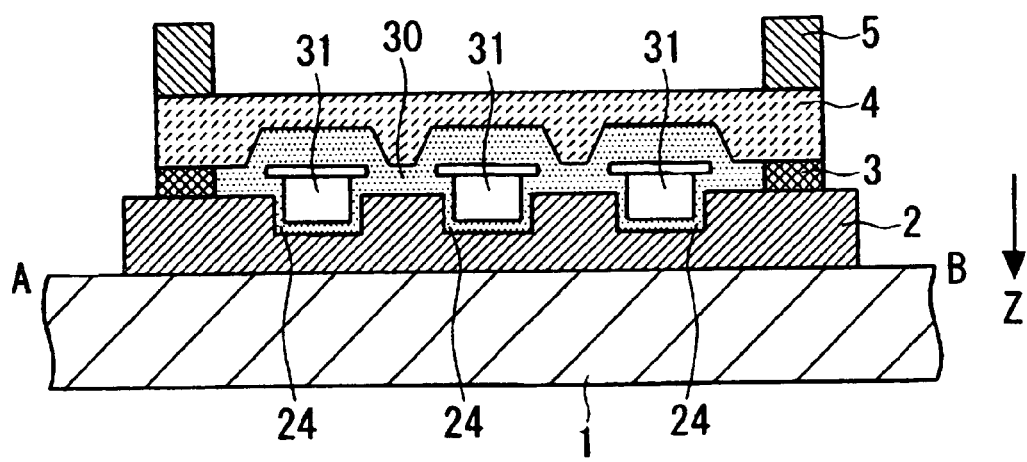
FIG. 2 is a schematic sectional view along line A–B in FIG. 1, and shows a state in which all of the mirrors have advanced into the grooves of the light guide substrate.
Figure 3:
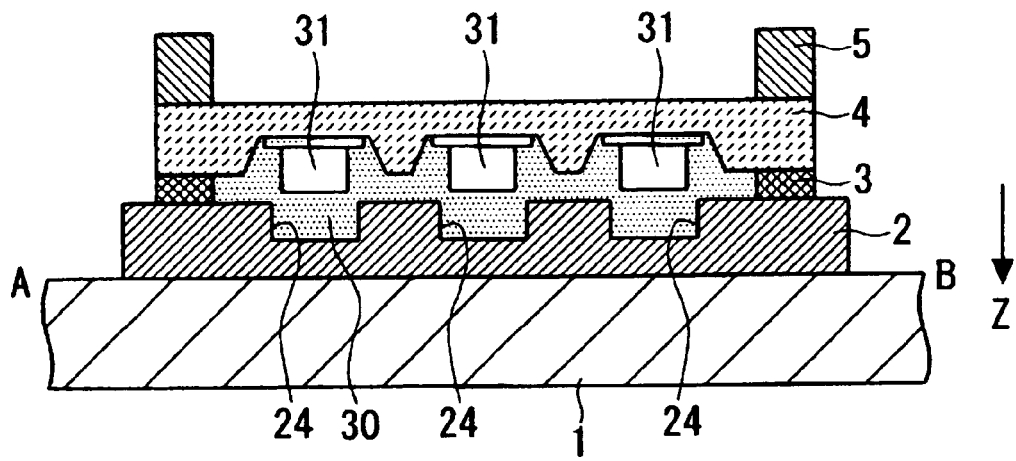
FIG. 3 is a schematic sectional view along line A–B in FIG. 1, and shows a state in which all of the mirrors have withdrawn from the grooves of the light guide substrate.
Figure 4:
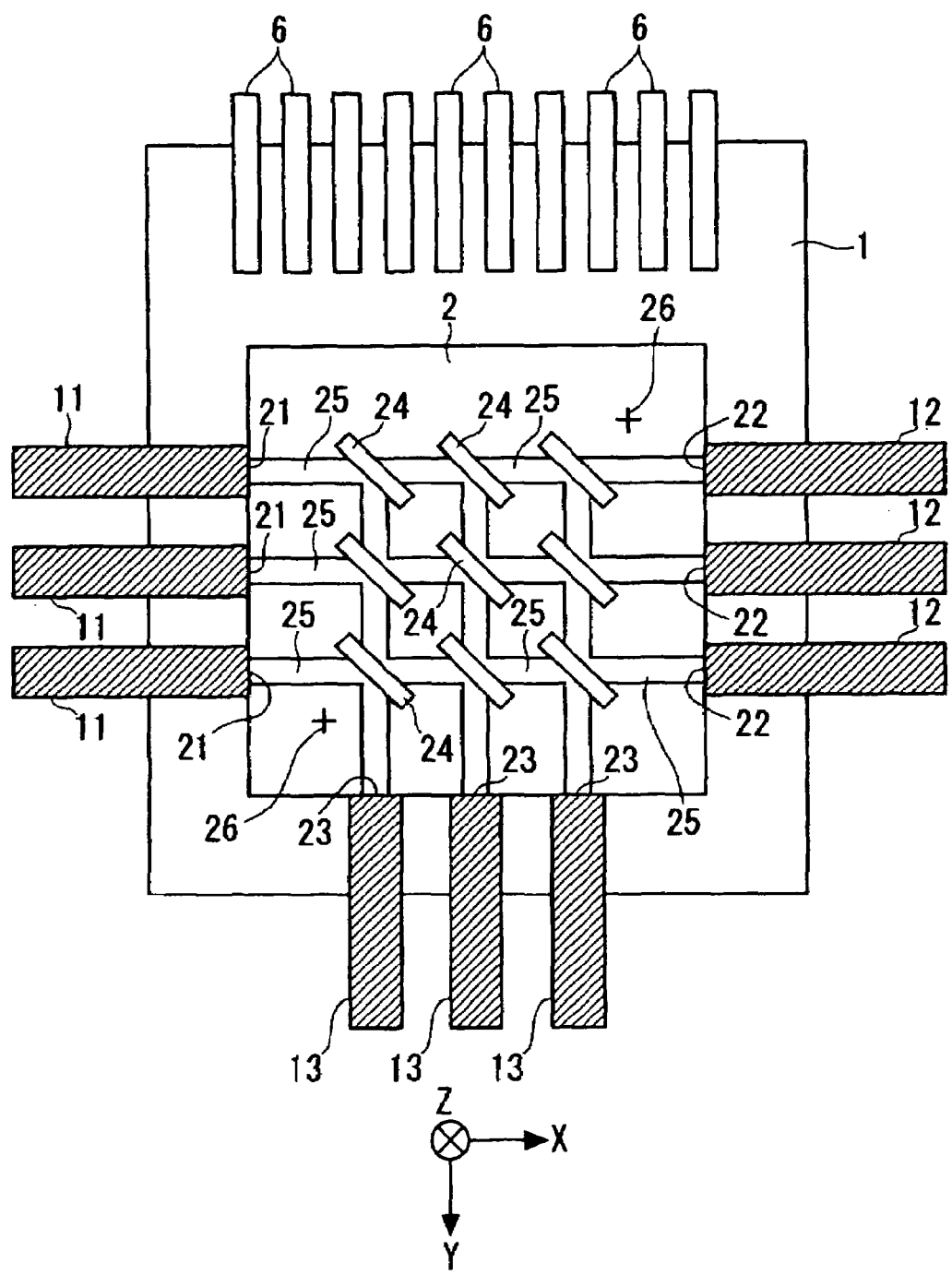
FIG. 4 is a schematic plan view which shows in model form the assembly of the substrate, light guide substrate, light input optical fibers, and light output optical fibers in the manufacturing process of the light beam switching and adjustment device shown in FIG. 1.

FIG. 2 is a schematic sectional view along line A–B in FIG. 1, and shows a state in which all of the mirrors 31 have advanced into the grooves 24 of the light guide substrate 2. FIG. 3 is a schematic sectional view along line A–B in FIG. 1, and shows a state in which all of the mirrors 31 have withdrawn from the grooves 24 of the light guide substrate 2. FIG. 4 is a schematic plan view which shows in model form the assembly of the substrate 1, light guide substrate 2, light input optical fibers 11, and light output optical fibers 12 and 13 in the manufacturing process of the light beam switching and adjustment device shown in FIG. 1.

As is shown in FIGS. 1 through 4, the light beam switching and adjustment device of the present embodiment comprises a substrate 1 such as a base disposed on the bottom surface part of a package main body (not shown in the figures) or inside a package main body, a light guide substrate 2 which is joined to the surface of the substrate 1, an actuator substrate 4 which is joined to the surface of the light guide substrate 2 with a spacer 3 interposed, and a relay substrate 5 which is joined to the surface of the actuator substrate 4.

As is shown in FIGS. 1 and 4, ten lead terminals 6 used for external connections are disposed on the substrate 1.

As is shown in FIGS. 2 through 4, the light guide substrate 2 has three input ports 21 in the left end surface in FIG. 4, three output ports 22 in the right end surface in FIG. 4, three output ports 23 in the lower end surface in FIG. 4, 3×3 grooves 24 used as mirror receiving recesses which are formed in the –Z-side surface of the light guide substrate 2, and light guides 25.

Three light input optical fibers 11 are optically coupled to the three input ports 21, three light output optical fibers 12 are optically coupled to the three output ports 22, and three light output optical fibers 13 are optically coupled to the three output ports 23.

The light guides 25 are formed so that these light guides conduct the light that is input into the three input ports 21 to selected output ports in accordance with the advance (see FIG. 2) and retraction (see FIG. 3) of 3×3 individual mirrors 31 (described later) corresponding to the 3×3 individual grooves 24. In the present embodiment, the light guides 25 are formed in the form of a 3×3 matrix, and the grooves 24 are respectively formed at the 3×3 intersection points of this matrix. The number of 3×3 described above is merely an example; the present invention is not limited to this number. In cases where a construction with the form of a two-dimensional matrix is used, this number may be set in general terms at M×N (M and N are integers of 2 or greater) instead of 3×3. For example, a case in which this number is 100×100 is the same in principle. Of course, in the present invention, it is not always necessary to use a two-dimensional matrix-form construction. The respective ports 21, 22 and 23 constitute the end portions of the light guides 25 appearing at the end surfaces of the light guide substrate 2. Furthermore, the light guides 25 are constructed from core layers, cladding layers and the like; the construction of these light guides 25 is universally known.

In order to suppress light loss, it is desirable that the width of the grooves 24 be set as narrow as possible. Furthermore, the respective grooves 24 that are lined up side by side in rectilinear form in FIG. 4 may also be connected so that these grooves are constructed as a single integral groove overall.

It goes without saying that such a light guide substrate 2 can be manufactured by a publicly known manufacturing method using a silicon substrate, glass substrate, or the like.

Unlike the case of a conventional light guide substrate, alignment marks 26 which are used for the alignment of the light guide substrate 2 and actuator substrate 4 are formed on the –Z-side surface of the light guide substrate 2 as shown in FIG. 4. For example, these alignment marks 26 can be formed by etching the light guide substrate 2 to a depth of approximately 1 μm using an ordinary photolithographic/etching technique, and these alignment marks 26 can be observed by means of infrared light. In the present embodiment, as is shown in FIG. 4, the alignment marks 26 are formed in two places with a cruciform pattern. However, the pattern and number, etc., of the alignment marks 26 may be appropriately set as desired. However, as will be described later, it is necessary that the alignment marks 26 be set so that these marks can be observed using infrared light in order to perform alignment by means of infrared light with alignment marks 39 formed on the actuator substrate 4.

Figure 5:
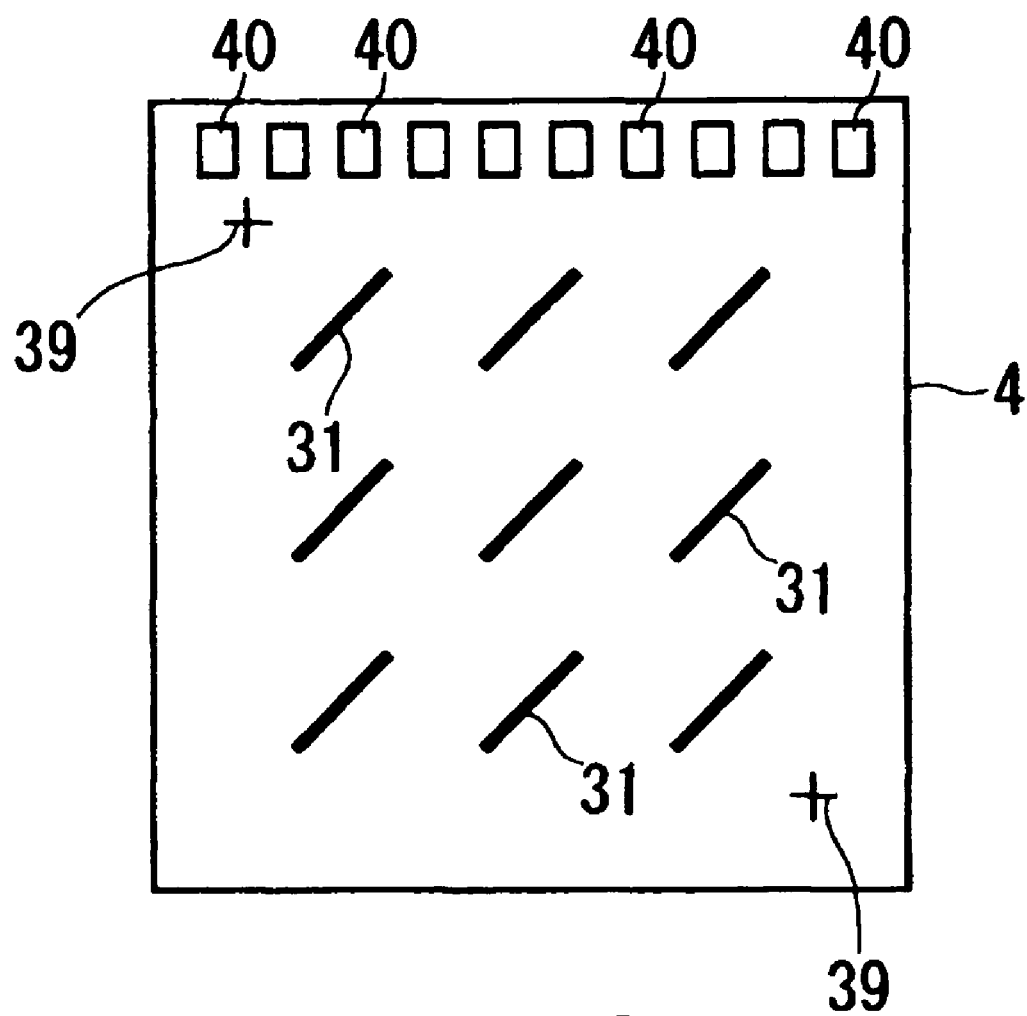
FIG. 5 is a schematic plan view which shows the actuator substrate in model form.
Figure 6:
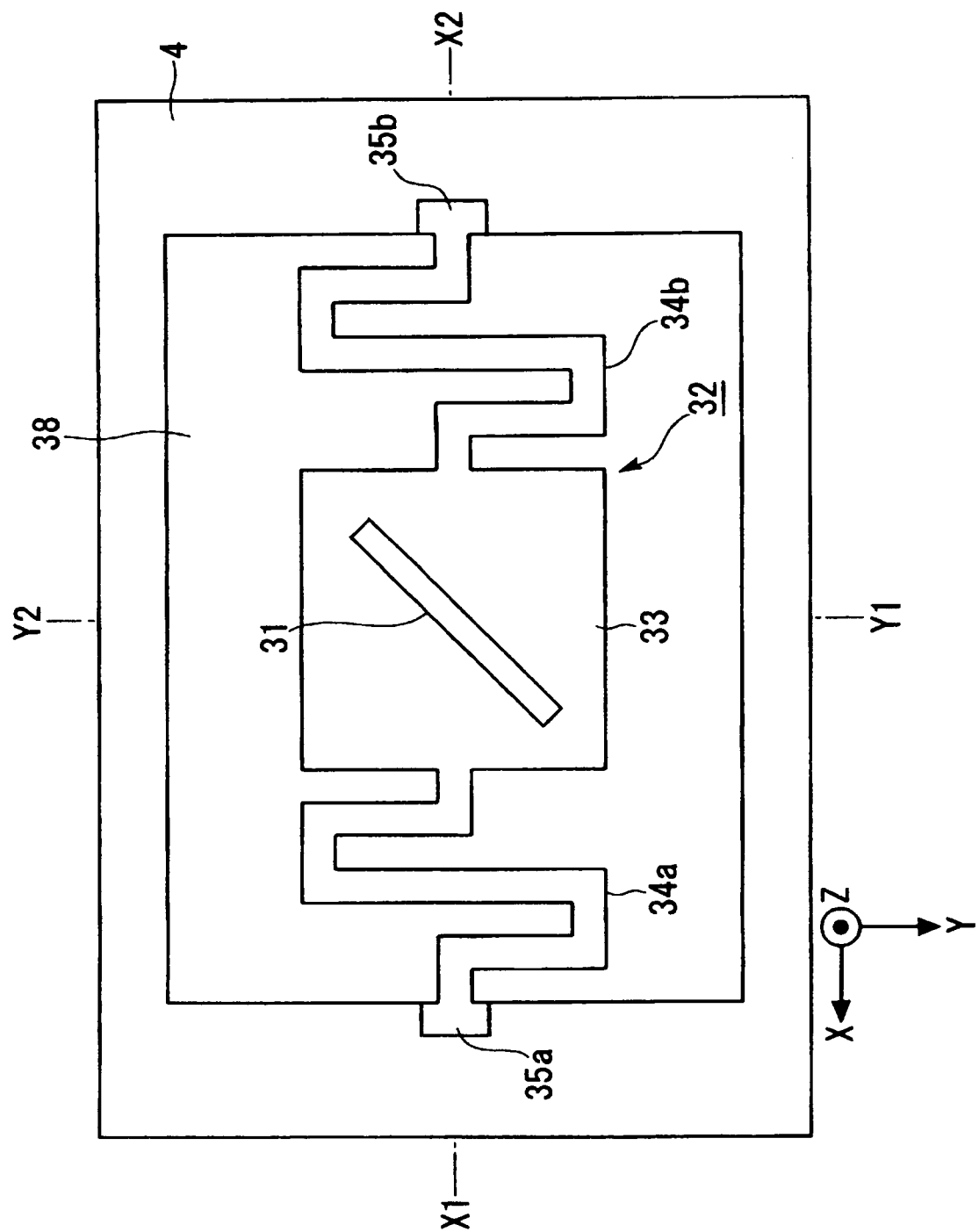
FIG. 6 is a schematic enlarged plan view which shows one of the mirrors and one of the actuators that supports and drives this mirror in model form.
Figure 7:
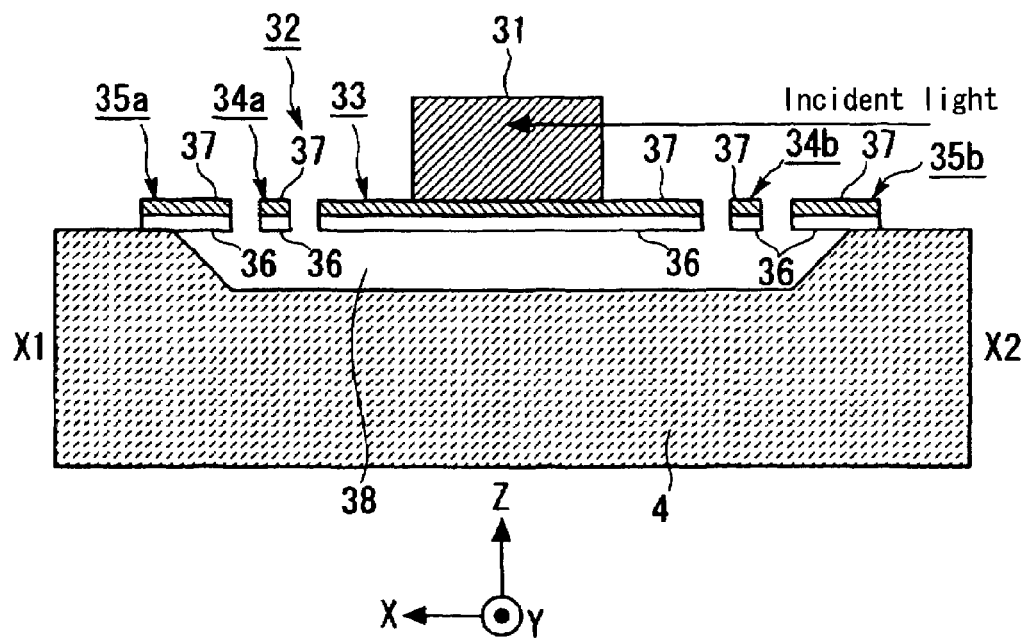
FIG. 7 is a schematic sectional view along line X1–X2 in FIG. 6.
Figure 8:
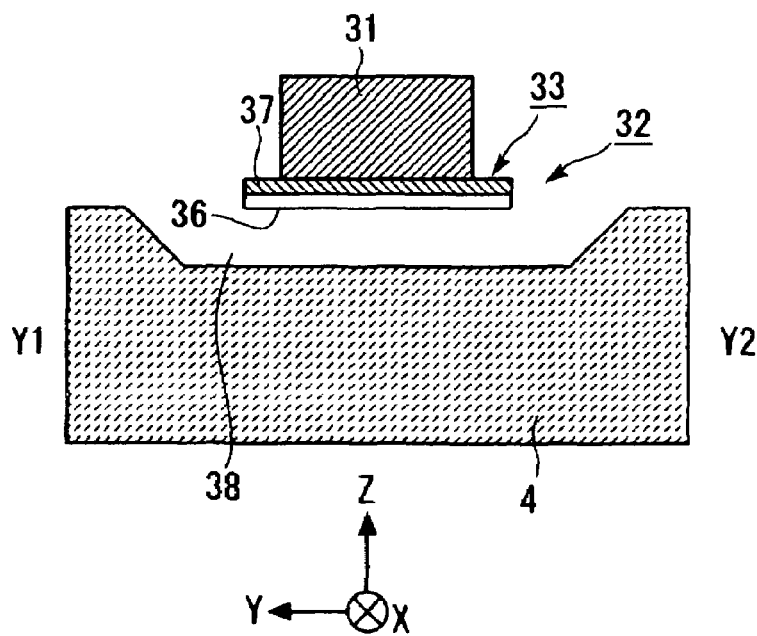
FIG. 8 is a schematic sectional view along line Y1–Y2 in FIG. 6.
Figure 9:
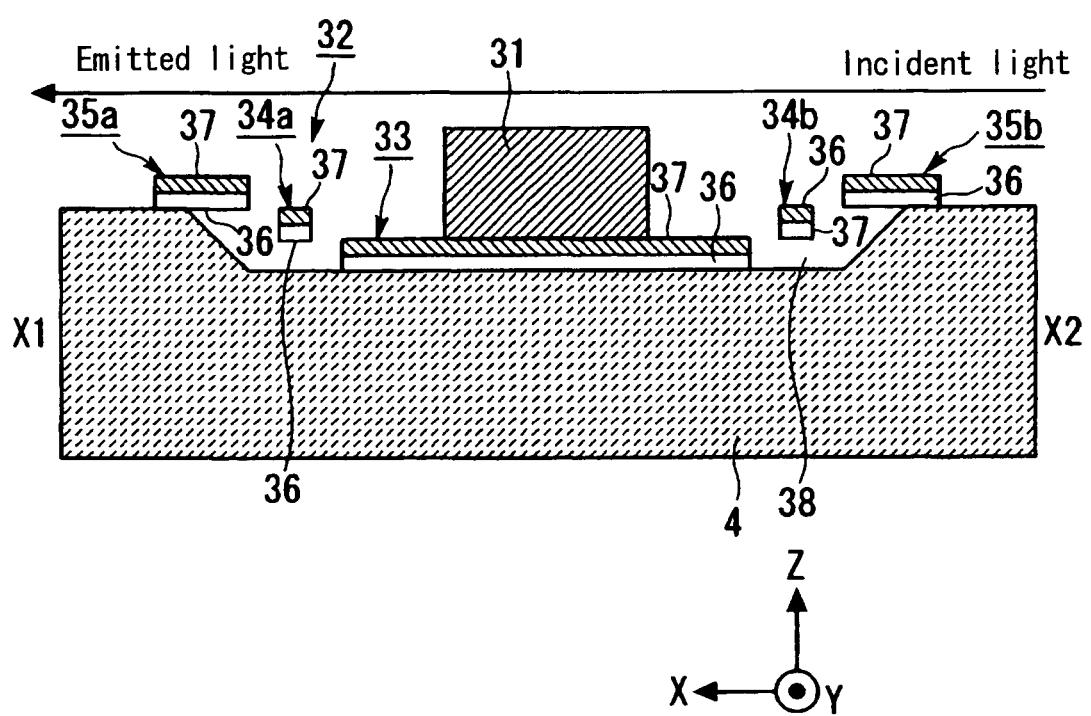
FIG. 9 is a schematic sectional view corresponding to FIG. 7 and showing a state in which the mirror is drawn in toward the substrate.
Figure 10:
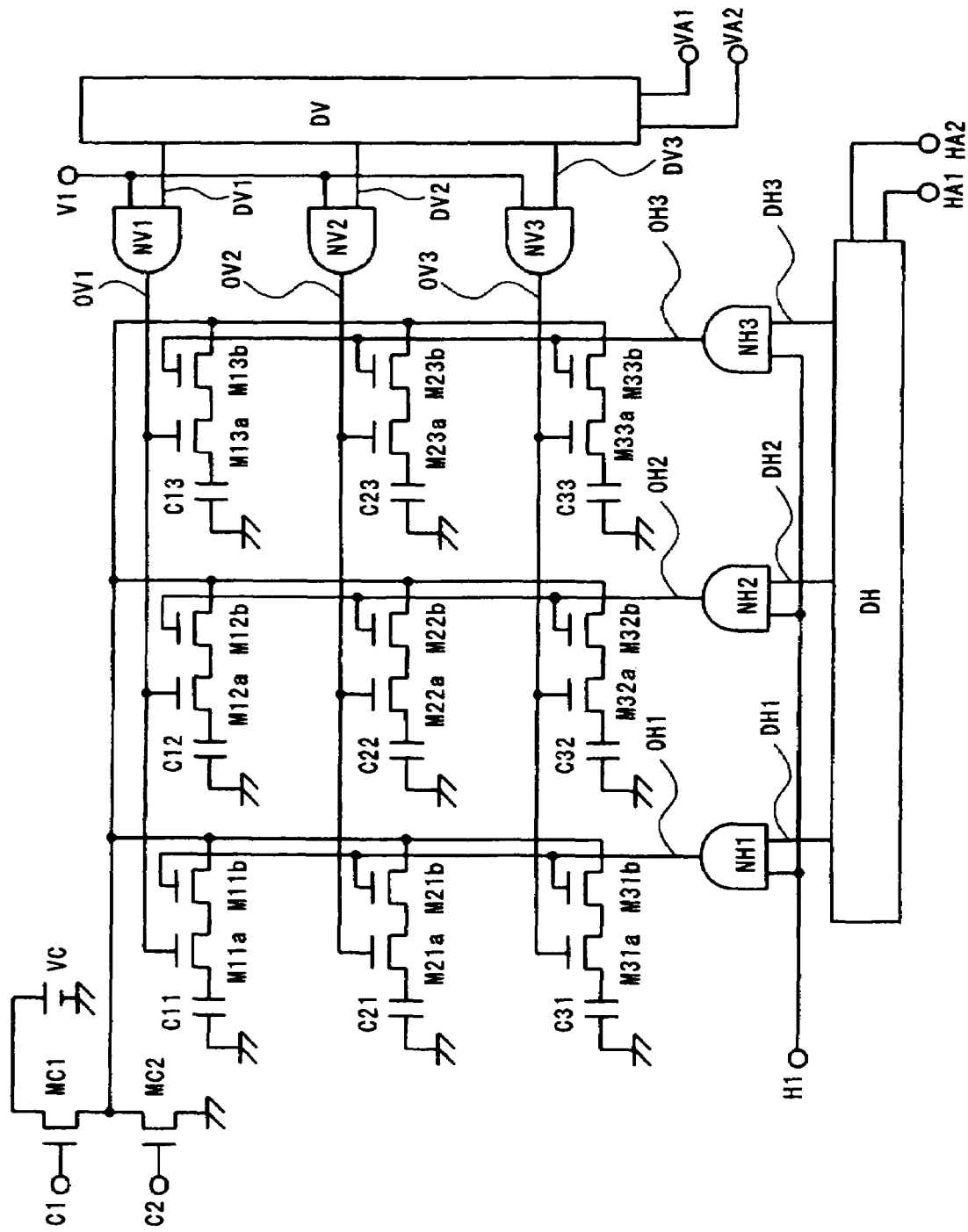
FIG. 10 is an electrical circuit diagram which shows the circuit mounted on the actuator substrate.

Next, the actuator substrate 4 will be described with reference to FIGS. 5 through 10. FIG. 5 is a schematic plan view which shows the actuator substrate 4 in model form. Furthermore, in FIG. 5, the actuators 32, wiring patterns, driving circuit and the like are omitted. FIG. 6 is a schematic enlarged plan view which shows one of the mirrors 31 and one of the actuators 32 that supports and drives this mirror 31 in model form. FIG. 7 is a schematic sectional view along line X1–X2 in FIG. 6. FIG. 8 is a schematic sectional view along line Y1–Y2 in FIG. 6. FIG. 9 is a schematic sectional view corresponding to FIG. 7, and shows a state in which the mirror 31 is held in a position that is relatively close to the +Z-side surface of the actuator substrate 4 (second position, which is a position on the +Z-side surface of the actuator substrate 4 in the present embodiment; this will be referred to below as a "state in which the mirror 31 is drawn in toward the substrate 4"). Incidentally, FIG. 7 shows a state in which the mirror 31 has returned to a position (first position) that is relatively distant from the +Z-side surface of the actuator substrate 4 (this will be referred to below as a "state in which the mirror 31 protrudes from the substrate 4"). FIG. 10 is an electrical circuit diagram which shows the circuit mounted on the actuator substrate 4.

The actuator substrate 4 has 3×3 micromirrors 31 and one or more actuators 32 which are disposed in positions corresponding to these mirrors 31 so that these actuators support the corresponding mirrors 31, and which position these corresponding mirrors 31 on the side of the +Z surface of the actuator substrate 4 (i.e., on the +Z side of the substrate 4) in a first position (see FIG. 7) that is relatively far from this surface or in a second position (see FIG. 9) that is relatively close to this surface, in accordance with signals. As is shown in FIG. 5, the 3×3 mirrors 31 are disposed in positions corresponding to the 3×3 grooves 24 in the light guide 25.

As is shown in FIGS. 6 through 9, each actuator 32 comprises a movable plate 33 and flexure parts 34a and 34b that are disposed on either side of the movable plate 33 in the direction of the X axis. Recessed parts 38 which form regions into which the movable plates 33 advance are formed in the actuator substrate. In the present embodiment, a semiconductor substrate such as a silicon substrate is used as the actuator substrate 4, and the portions that face the movable plates 33 on the substrate 4 constitute first electrode parts. Of course, it would also be possible to form the first electrode parts separately from the substrate 4 by means of metal films or the like on the surface of the substrate 4.

Each movable plate 33 is formed by a thin film, and is constructed from a lower-side insulating film 36 consisting of an SiN film or $SiO_2$ film, and a metal film 37 such as an Al film used as a second electrode part, which is formed on top of the lower side insulating film 36. The metal film 37 can generate an electrostatic force between this metal film 37 and the substrate 4 that constitutes the first electrode part by means of a voltage that is applied across this metal film 37 and the substrate 4.

In the present embodiment, both end portions of each movable plate 33 in the direction of the X axis are mechanically connected to the peripheral portions of the recessed part 38 in the substrate 4 via the respective flexure parts 34a and 34b (acting as spring parts that possess springiness) and anchor parts 35a and 35b in that order. The flexure parts 34a and 34b and anchor parts 35a and 35b are each constructed from a lower-side insulating film 36 and an upper-side metal film 37 that extend "as is" as continuations of the movable plate 33. In the anchor parts 35a and 35b, the upper-side metal films 37 are respectively electrically connected to specified locations on the substrate 4 via holes (not shown in the figures) formed in the lower-side insulating films 36.

As is shown in FIG. 6, the flexure parts 34a and 34b have a sinuous shape (as seen in a plan view). As a result, the corresponding movable plate 33 can move upward and downward (i.e., in the direction of the Z axis). Specifically, in the present embodiment, the system is devised so that each movable plate 33 can move between an upper-side position (first position) (see FIGS. 7 and 8) to which the movable plate 33 is caused to return by the spring force (returning force) of the flexure parts 34a and 34b when no electrostatic force is acting on the movable plate 33 (i.e., when absolutely no signal is applied), and a lower-side position (second position) (see FIG. 9) where the movable plate 33 advances into the recessed part 38 of the substrate 4 and contacts the bottom part of this recessed part 38 when an electrostatic force acts on the movable plate 33 (i.e., when a signal is applied).

The mirrors 31 are fastened to the upper surfaces of the movable plates 33 in an upright attitude. The orientation of the reflective surfaces of the mirrors 31 is set so that the normal of each mirror 31 forms an angle of 45° with the X axis in a plane parallel to the XY plane. Of course, this orientation may be appropriately altered in accordance with the disposition of the light guides 25.

In a state in which the mirrors 31 have returned to the first positions on the side of the substrate 4 (i.e., a state in which the mirrors 31 protrude from the substrate 4), as is shown in FIG. 7, the incident light advancing in the direction of the X axis is reflected by the mirrors 31 and advances toward the front with respect to the plane of the page in FIG. 7. In a state in which the mirrors 31 are positioned in the second positions (i.e., a state in which the mirrors 31 are drawn in toward the substrate 4), as is shown in FIG. 9, the incident light advancing in the direction of the X axis is not reflected by the mirrors 31, and passes through "as is" to form emitted light.

In FIGS. 7 and 9, the incident light that reaches the positions of the mirrors 31 is shown as though this light were propagated through space. However, as a result of the light guide substrate 2 and actuator substrate 4 being aligned and joined with a spacer 3 interposed as shown in FIGS. 2 and 3, this incident light, after being guided by the light guides 25 of the light guide substrate 2 so that this light reaches the interiors of the grooves 24 in the light guide substrate 2, is guided to the light guide 25 in the direction in question after being either reflected or allowed to pass through "as is" by the mirrors 31 according to whether the mirrors 31 are positioned in the first or second positions.

Specifically, the light guide substrate 2 and actuator substrate 4 are aligned and joined with a spacer 3 interposed so that the first positions of the respective mirrors 31 are positions in which the mirrors 31 are advanced relative to the respective grooves 24 in the light guide substrate 2, and so that the second positions of the respective mirrors 31 are positions in which the mirrors 31 are retracted relative to the respective grooves 24.

Figure 11A:
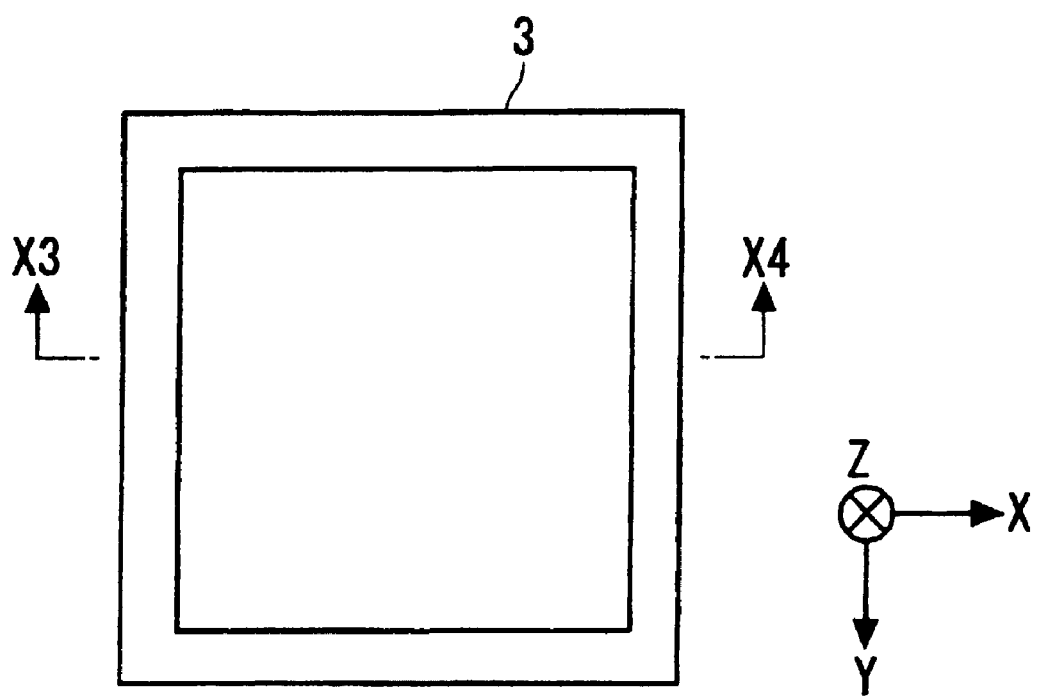
FIG. 11 is a diagram which shows the spacer.
Figure 11B:
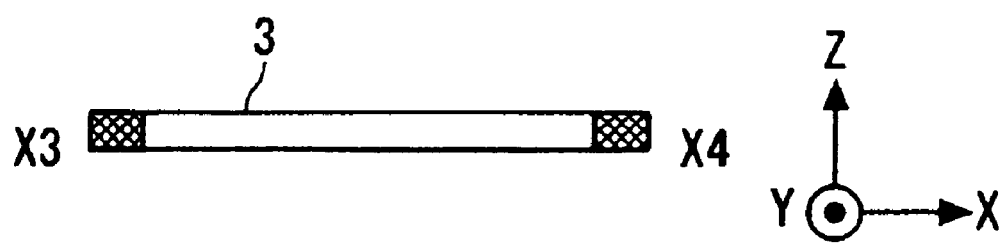

In the present embodiment, as is shown in FIG. 3, the thickness of the spacer 3 is set so that the second positions of the respective mirrors 31 are positions in which the mirrors are completely retracted from the grooves 24. As is shown in FIG. 11, the spacer 3 is constructed in the form of a frame and disposed so that this spacer 3 surrounds the area in which all of the mirrors 31 are distributed. FIG. 11 shows the spacer 3; FIG. 11(a) is a plan view, and FIG. 11(b) is an arrow view along line X3–X4 in FIG. 11(a).

As is shown in FIGS. 2 and 3, the space between the light guide substrate 2 and actuator substrate 4 is filled with a refractive index adjusting liquid 30 which has substantially the same refractive index as the refractive index of the core layers of the light guides 25 of the light guide substrate 2, so that this liquid enters the interiors of the grooves 24. The spacer 3 forms one portion of a sealing structure that seals the refractive index adjusting liquid 30. The spacer 3 plays a large role in preventing damage to the mirrors 31 during the alignment of the light guide substrate 2 and actuator substrate 4 (as will be described later). This spacer 3 also has the function of allowing easy sealing of the refractive index adjusting liquid 30. As a result of the spacer 3 thus being endowed with the function of sealing the refractive index adjusting liquid 30, there is no need for the separate installation of a special sealing member. Furthermore, from the standpoint of reducing the amount of light loss, it is desirable to fill the space described above with a refractive index adjusting liquid 30; however, it is not absolutely necessary to fill this space with such a refractive index adjusting liquid 30.

As is shown in FIG. 5, alignment marks 39 which are used for the alignment of the light guide substrate 2 and actuator substrate 4 are formed on the +Z-side surface of the actuator substrate 4. These alignment marks 39 are disposed so that these marks 39 are precisely superimposed on the alignment marks 26 (see FIG. 4) formed on light guide substrate 2 as shown in FIG. 1 when the two substrates are accurately aligned as described above. For example, these alignment marks 39 can also be formed by etching the actuator substrate 4 to a depth of approximately 1 µm using an ordinary photolithographic/etching technique, and these alignment marks 39 can be observed by means of infrared light. The actuator substrate 4 is constructed from a silicon substrate or the like, and has the characteristic of blocking visible light, but transmitting infrared light. By thus forming the alignment marks 39 as marks that can be observed using infrared light, and observing these marks 39 via an actuator substrate 4 made of a material that allows the transmission of infrared light, it is possible to recognize the positions of the alignment marks 39 even in cases where the alignment marks 39 are disposed on the back side of the actuator substrate 4.

In the present embodiment, the driving circuit shown in FIG. 10 is mounted on the actuator substrate 4. However, the voltage VC in FIG. 10 is supplied from the outside.

In electrical-circuit terms, the single actuator 32 that drives the single mirror 31 shown in FIGS. 6 through 9 may be viewed as a single capacitor (a capacitor formed by the first electrode part (substrate 4) and second electrode part (metal film 37 which constitutes the movable plate 21)). In FIG. 10, the capacitors of the actuators 32 in m rows and n columns are respectively indicated as Cmn. For example, the capacitor of the actuator 32 at the upper left (row 1, column 1) in FIG. 10 is indicated as C11. When voltages are applied to the capacitors Cmn, an electrostatic force that causes mutual attraction is generated between the movable plates 21 of the corresponding actuators and the substrate 4, so that the mirrors 31 assume a state in which these mirrors are drawn in toward the substrate 4 as shown in FIGS. 3 and 9. When the capacitors Cmn are discharged, the electrostatic force between the movable plates 33 of the corresponding actuators and the substrate 4 disappears, so that the mirrors 31 are caused by the spring force to assume a state in which the mirrors 31 protrude from the substrate 4 as shown in FIGS. 2 and 7. Specifically, the corresponding mirrors 31 can be moved by applying a voltage to the capacitors Cmn and discharging this voltage.

In the circuit shown in FIG. 10, column selection switches Mmnb and row selection switches Mmna are disposed for the capacitors Cmn. One end of each capacitor Cmn is connected to one end of the corresponding row selection switch Mmna, the other end of this row selection switch Mmna is connected to one end of the corresponding column selection switch Mmnb, and the other end of this column selection switch Mmnb is connected to one end of a voltage control switch MC1 and one end of a voltage control switch MC2. The other end of each capacitor Cmn is connected to ground. The other end of the voltage control switch MC1 is connected to a clamping voltage VC, and the other end of the voltage control switch MC2 is connected to ground. The gates of the voltage control switches MC1 and MC2 are respectively connected to terminals C1 and C2.

For example, in cases where a silicon substrate is used as the actuator substrate 4, the column selection switches Mmnb, row selection switches Mmna, and voltage control switches MC1 and MC2 used as switching elements can be constructed from N-type MOS transistors formed on the substrate 4. Here, it is assumed that these switches are constructed from N-type MOS transistors.

The gates of the row selection switches M11a, M12a and M13a of the first row are connected in common by wiring OV1, and are connected to the output terminal of a NOR gate NV1 (furthermore, in the figure, the NOR gates are indicated by the symbol commonly used for AND gates; however, these gates are all NOR gates). Similarly, the gates of the row selection switches of the second row are connected to the output terminal of a NOR gate NV2 by wiring OV2, and the gates of the row selection switches of the third row are connected to the output terminal of a NOR gate NV3 by wiring OV3. One of the input terminals of each of the NOR gates NV1 through NV3 is connected to a terminal V1, and the other input terminals of these NOR gates are respectively connected to the respective output terminals of a decoder DV via respective sets of wiring DV1 through DV3. The decoder DV supplies row selection signals corresponding to the states of address terminals VA1 and VA2 to the wiring DV1 through DV3.

The gates of the column selection switches M11b, M12b and M13b of the first column are connected in common by wiring OH1, and are connected to the output terminal of a NOR gate NH1. Similarly, the gates of the column selection switches of the second column are connected to the output terminal of a NOR gate NH2 by wiring OH2, and the gates of the column selection switches of the third column are connected to the output terminal of a NOR gate NH3 by wiring OH3. One of the input terminals of each of the NOR gates NH1 through NH3 is connected to a terminal H1, and the other input terminals of these NOR gates are respectively connected to the respective output terminals of a decoder DH via respective sets of wiring DH1 through DH3. The decoder DH supplies column selection signals corresponding to the states of address terminals HA1 and HA2 to the wiring DH1 through DH3.

In the use state of an ordinary light beam switching and adjustment device, it is necessary to move specified mirrors 31 as required. For example, in a case where only the mirror 31 corresponding to the capacitor C11 is to be placed in a state in which this mirror 31 protrudes from the substrate 4 as shown in FIGS. 7 and 8 from a state in which all of the mirrors 31 are drawn in toward the substrate 4 as shown in FIGS. 3 and 9, i.e., a state in which a voltage is applied to all of the capacitors, the switches M11a, M11b and MC2 are switched ON, so that the capacitor C11 is discharged.

In this case, if the respective switches are N-type MOS transistors, the sets of wiring OH1 and OV1 are placed at a high level of approximately 5 V, and the sets of wiring OH2, OH3, OV2 and OV3 are placed at a low level of approximately 0 V. If the terminal C2 is then placed at a high level, a discharge of the capacitor C11 occurs.

The wiring OH1 can be placed at a high level by placing either of the input terminals of the NOR gate NH1 at a low level. The terminal H1 is constantly maintained at a high level, and the wiring DH1 is controlled by the states of the address terminals HA1 and HA2 of the decoder DH. For example, the logic of the decoder DH is constructed so that when HA1 is at a high level and HA2 is at a low level, DH1 is at a low level, and DH2 and DH3 are at a high level. Similarly, the wiring OV1 can be placed at a high level by placing either of the input terminals of the NOR gate NV1 at a low level. The terminal V1 is constantly maintained at a high level, and the wiring DV1 is controlled by the states of the address terminals VA1 and VA2 of the decoder DV. For example, the logic of the decoder DV is constructed so that when VA1 is at a high level and VA2 is at a low level, DV1 is at a low level, and DV2 and DV3 are at a high level. Where N is the number of address terminals, a decoder circuit with a maximum of $2^N$ outputs can be constructed by ordinary methods.

The operation of such an ordinary light beam switching and adjustment device in the use state can be realized by removing the NOR gates NV1 through NV3 and NH1 through NH3 and the terminals V1 and H1, making a direct connection between the wiring OV1 and DV1, and also making direct connections between the corresponding sets of wiring. Such a driving circuit construction is a circuit construction that is formed in accordance with conventional technical common sense.

In the present embodiment, on the other hand, all of the switches Mmna and Mmnb can be switched ON independently of the outputs of the decoders DH and DV by adding the NOR gates NV1 through NV3 and NH1 through NH3 and terminals V1 and H1 and wiring these parts as described above, so that the control terminals H1 and V1 are placed at a low level. In this case, if the terminals H1 and V1 are placed at a low level and the terminal C1 is placed at a high level, all of the capacitors Cmn are charged. As a result, a state is created in which all of the mirrors 31 are drawn in toward the substrate 4.

Accordingly, in the present embodiment, a state can be created in which all of the mirrors 31 are drawn in toward the substrate 4 merely by supplying the respective specified signals described above to a total of six terminals, i.e., the terminals H1, V1, C1 and C2, the clamping voltage VC terminal (not shown in the figure), and the ground terminal (not shown in the figure), without supplying signals to the address terminals VA1, VA2, HA1 and HA2 (i.e., by placing these address terminals in an electrically floating state). Furthermore, since the signals that are to be applied to the terminals H1 and V1 are always the same, both of these terminals can be connected in common. In this case, the number of terminals that is to be used can be further reduced by 1.

Of course, even if the circuit construction described above in which the NOR gates NV1 through NV3 and NH1 through NH3 and the terminals V1 and H1 are excluded is used, a state can be created in which all of the mirrors 31 are drawn in toward the substrate 4 by supplying respective specified signals to a total of eight terminals, i.e., the terminals C1, C2, VA1, VA2, HA1 and HA2, the clamping voltage VC terminal, and the ground terminal. In this case, however, an increase in the number of terminals that must be used cannot be avoided. In particular, when the number of mirrors 31 increases, there is also a corresponding increase in the number of address terminals; as a result, there is a great increase in the number of terminals that must be used in order to place all of the mirrors 31 in a state in which the mirrors are drawn in toward the substrate 4. For example, in cases where the number of light input optical fibers 11, the number of light output optical fibers 12, and the number of light output optical fibers 13 are all 64, the number of mirrors 31 is 64×64. Since 64=$2^6$, the total number of address terminals required is 12, i.e., 6 horizontal and 6 vertical.

In this case, in order to place all of the mirrors 31 in the state shown in FIG. 9 using the circuit construction in which the NOR gates NV1 through NV3 and NH1 through NH3 and the terminals V1 and H1 are removed, it is necessary to supply signals to 12 address terminals in addition to the terminals C1 and C2, the clamping voltage VC terminal and the ground terminal, so that signals must be supplied to a total of 16 terminals. On the other hand, if a circuit construction which uses the NOR gates NV1 through NV3 and NH1 through NH3 and the terminals V1 and H1 is employed as in the present embodiment, even if the number of mirrors 31 is 64×64, all of the mirrors 31 can be placed in a state in which the mirrors are drawn in toward the substrate 4 merely by supplying signals to 6 terminals regardless of the number of mirrors 31.

Significant advantages can be obtained in the manufacture of the light beam switching and adjustment device of the present embodiment as a result of the fact that all of the mirrors 31 are placed in a state in which the mirrors are drawn in toward the substrate 4, and the fact that only a small number of terminals need be used in order to create this state; however, these points will be described later.

In the present embodiment, as is shown in FIG. 5, 10 pads (first pads) 40 used for electrical connections, which respectively correspond to the terminals H1, V1, C1, C2, VA1, VA2, HA1 and HA2, the clamping voltage VC terminal, and the ground terminal, are formed on the +Z-side surface of the actuator substrate 4.

For example, the actuator substrate 4 constructed as described above can be manufactured using semiconductor manufacturing techniques such as film formation, patterning and etching besides a MOS transistor manufacturing process.

Figure 12:
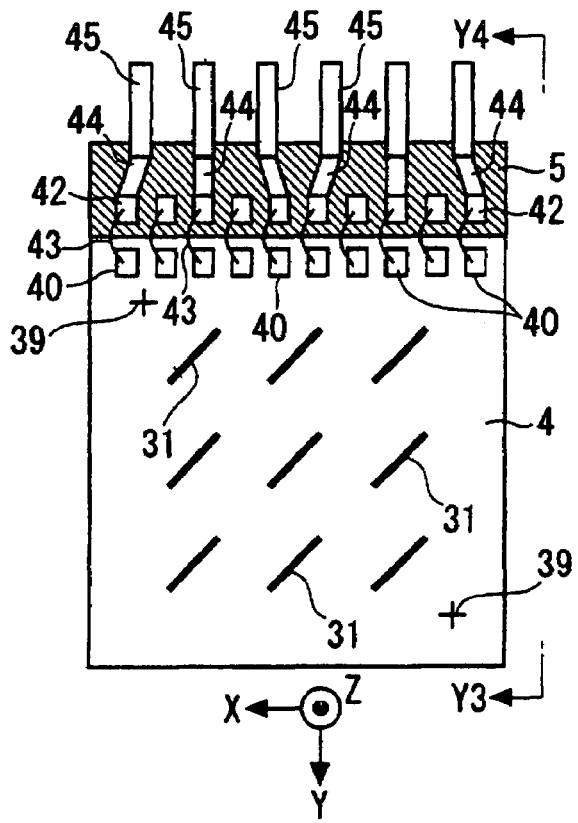
FIG. 12 is a diagram which shows in model form the assembly of the actuator substrate and relay substrate in the manufacturing process of the light beam switching and adjustment device shown in FIG. 1.
Figure 12:
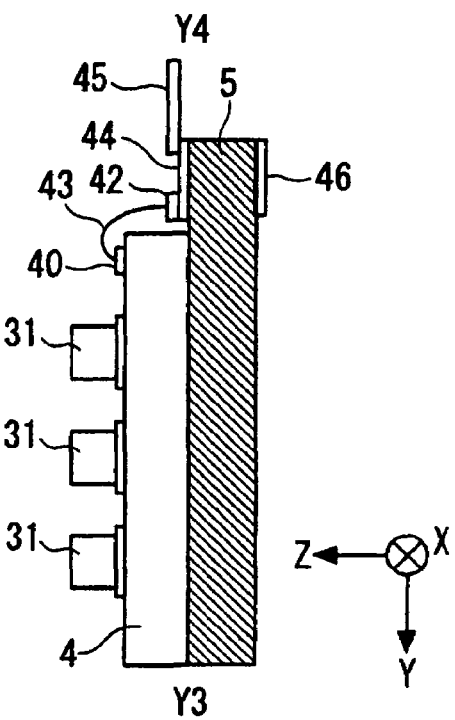
Figure 12:
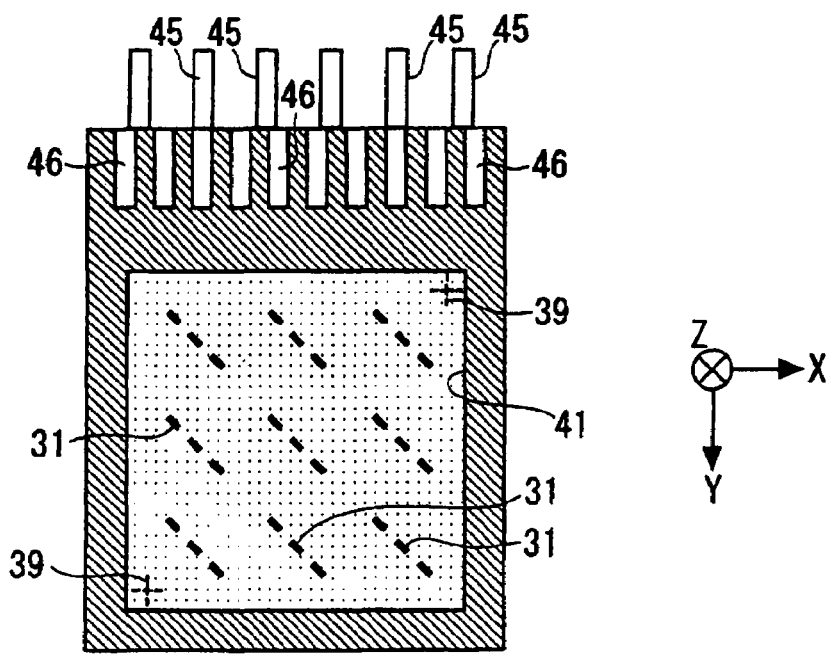

Here, the relationship between the actuator substrate 4 and the relay substrate 5 will be described not only with reference to FIGS. 1 through 3, but also with reference to FIG. 12. FIG. 12 comprises diagrams which show (in model form) the assembly of the actuator substrate 4 and relay substrate 5 in the manufacturing process of the light beam switching and adjustment device shown in FIG. 1. FIG. 12(a) is a schematic plan view as seen from the +Z side, FIG. 12(b) is an arrow view along line Y3–Y4 in FIG. 12(a), and FIG. 12(c) is a schematic plan view as seen from the –Z side.

As is shown in these figures, the relay substrate 5 is a substrate which is used to relay electrical connections to the actuator substrate 4. For example, this substrate is constructed from a ceramic substrate, and has characteristics that substantially prevent the transmission of infrared light. The relay substrate 5 is joined to the –Z-side surface of the actuator substrate 4 so that a portion of this substrate 5 protrudes from the actuator substrate 4. An opening part 41 is formed in the central portion of the relay substrate 5 so that the relay substrate 5 does not cover the –Z-side surface regions of the actuator substrate 4 corresponding to the alignment marks 39 formed on the +Z-side surface of the actuator substrate 4. Even if the relay substrate 5 is a substrate that allows the transmission of infrared light, it is desirable to form such an opening part 41 in order to minimize the attenuation of infrared light so that the alignment marks 39 can be clearly recognized.

As is shown in FIG. 12, 10 pads (second pads) 42 used for electrical connections, which correspond to the pads (first pads) 40 on the actuator substrate 4 on a one-to-one basis, are formed on the +Z-side surface of the portion of the relay substrate 5 that protrudes from the actuator substrate 4. The respective pads 40 and respective pads 42 are electrically connected by bonding wires 43 consisting of metal wires, etc. Thus, as a result of a portion that protrudes from the actuator substrate 4 being formed on the relay substrate 5, the pads (second pads) 42 used for electrical connections can be disposed on this protruding portion, so that the electrical connection of these pads 42 with the pads (first pads) 40 on the actuator substrate 4 is facilitated. If wire bonding is used for such electrical connections as described above, the work is facilitated.

Six wiring patterns 44 that are respectively electrically connected to six of the pads 42 among the 10 pads 42 are formed on the +Z-side surface of the protruding portion of the relay substrate 5. These six wiring patterns 44 respectively extend to the end edge of the protruding portion, and the disposition pitch of the parts in the vicinity of this end edge is wider than the disposition pitch of the pads 40 and the disposition pitch of pads 46 (described later). In the state shown in FIG. 12, the root portions of six temporary lead terminals 45 are connected to portions of the six wiring patterns 44 located in the vicinity of the end edge, and the disposition pitch of these lead terminals 45 is also wide. As a result of the disposition pitch of the portions of the six wiring patterns 44 located in the vicinity of the end edge thus being set at a pitch that is wider than the disposition pitch of the pads 40 and the disposition pitch of the pads 46 (described later), the attachment of the lead wires is facilitated when such lead wires are connected to the temporary lead terminals 45 so that the actuator substrate 4 and light guide substrate 2 are aligned in a state in which all of the mirrors 31 are drawn in toward the substrate 4 by supplying electric power from a temporary voltage application circuit and actuating the microactuators (as will be described later).

The six pads 42 respectively correspond to the terminals H1, V1, C1 and C2, the clamping voltage VC terminal and the ground terminal that are used in order to place all of the mirrors 31 in a state in which the mirrors are drawn in toward the substrate 4. Accordingly, these six terminals are respectively electrically connected to the lead terminals 45. Consequently, when the specified signals described above are supplied from the six lead terminals 45, all of the mirrors 31 can be placed in a state in which the mirrors are drawn in toward the substrate 4. In the state shown in FIG. 12, since absolutely no signals are supplied, all of the mirrors 31 are in a state in which the mirrors protrude from the actuator substrate 4 as shown in FIG. 12(b). As will be described later, the lead terminals 45 are used when the light guide substrate 2 and actuator substrate 4 are aligned. Following this alignment, the lead terminals 45 are cut along the end edge of the relay substrate 5, so that only the root portions of the lead terminals 45 remain on the wiring patterns 44. Accordingly, the lead terminals 45 do not appear in FIG. 1.

In the present embodiment, the six wiring patterns 44 and the remaining root portions of the lead terminals 45 form six conductive parts that are respectively electrically connected to the six pads 40. As will be seen from the description above, the disposition pitch of these conductive parts toward the end edge is wider than the disposition pitch of the pads 40 and the disposition pitch of the pads 46 (described later).

As is shown in FIGS. 1 and 12, ten pads (third pads) 46 used for electrical connections are formed on the −Z-side surface of the relay substrate 5. The ten third pads 46 are respectively electrically connected to the ten second pads 42 via through-holes not shown in the figures. As a result of the surface of the relay substrate 5 on which the second pads 42 are disposed and the surface of the relay substrate 5 on which the pads (third pads) 46 used for electrical connections are disposed thus being made opposite surfaces, positional interference between the second pads 42 and third pads 46 can be prevented. Furthermore, as a result of this, external wiring can be connected to the third pads 46 which are positioned on the outside of the assembly in a state in which the light guide substrate 2 and actuator substrate 4 are assembled, so that external wiring work is facilitated.

As is shown in FIG. 1, the ten pads 46 are respectively electrically connected by means of bonding wires 47 consisting of metal wires, etc., to ten lead terminals 6 used for external connections disposed on the substrate 1. It is not absolutely necessary to use bonding wires for such connections; however, the work can be made more efficient by employing a connection method using bonding wires. Accordingly, the ten lead terminals 6 used for external connections are respectively electrically connected to the terminals H1, V1, C1, C2, VA1, VA2, HA1 and HA2, the clamping voltage VC terminal, and the ground terminal. Consequently, signals for performing desired optical switching operations can be supplied from the lead terminals 6 used for external connections.

As a result of the electrical connections described above being made, the driving circuit shown in FIG. 10 that is mounted on the actuator substrate 4 drives the actuators 32 so that desired optical switching operations are performed when signals that cause these optical switching operations to be performed are respectively supplied to the ten pads 46, and so that all of the mirrors 31 are placed in a state in which the mirrors are drawn in toward the substrate 4 when specified signals are respectively supplied to the six conductive parts.

Figure 13:
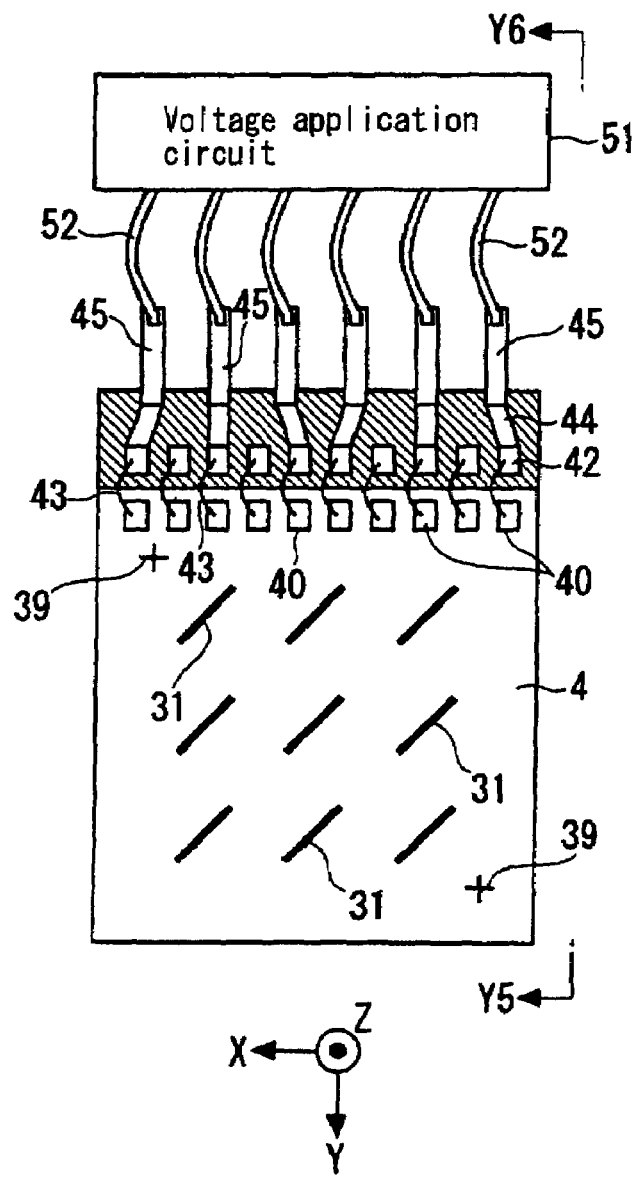
FIG. 13 is a diagram which shows the conditions of voltage application to the assembly shown in FIG. 12.
Figure 13:
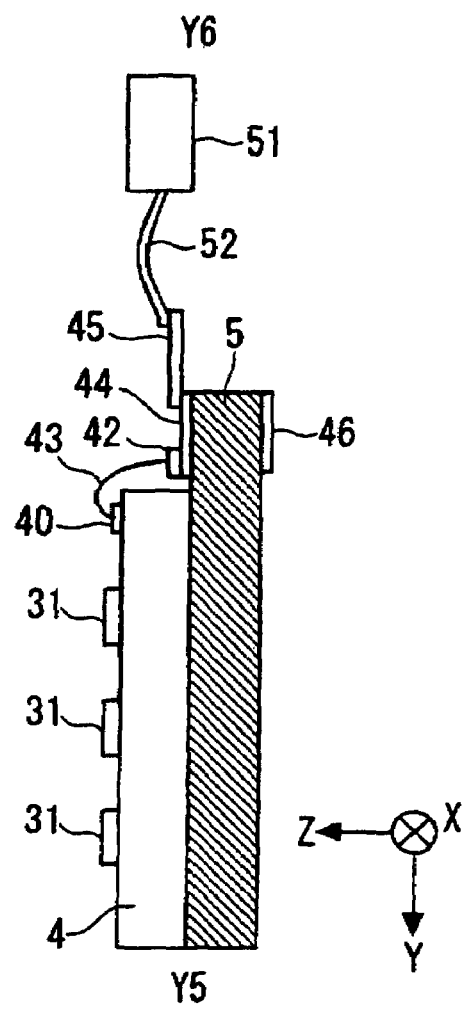

Furthermore, in a case where the relay substrate 5 shown in FIG. 13 is used, unlike the example shown in FIG. 1, electric power can be directly supplied to the actuator substrate 4 without using the external connection lead terminals 6 disposed on the substrate 1.

Furthermore, it is not absolutely necessary to use the relay substrate shown in FIG. 13 to supply electric power directly to the actuator substrate 4. For example, in FIG. 13, it would also be possible to remove the relay substrate 5 and the second pads 42, wiring patterns 44, lead terminals 45 and third pads 46 belonging to this substrate, to connect outside lead wiring directly to the pads 40 beforehand, and to supply electric power via this lead wiring. If this is done, electric power can be supplied directly to the actuator substrate 4 without using a relay substrate 5 and without using external connection lead terminals 6 disposed on the substrate 1; accordingly, the structure is simplified.

Next, one example of the method for manufacturing the light beam switching and adjustment device of the present embodiment will be described.

First, the substrate 1, light guide substrate 2, external connection lead terminals 6 and optical fibers 11, 12 and 13 are respectively prepared, and these parts are assembled into the state of the assembly shown in FIG. 4. Specifically, the lead terminals 6 are attached to the substrate 1, the light guide substrate 2 is joined to the substrate 1 by means of a bonding agent, etc., and the optical fibers 11 through 13 are respectively coupled with the respective ports 21 through 23 of the light guide substrate 2. Of course, as will be described later, the joining of the light guide substrate 2 to the substrate 1 and the coupling of the optical fibers 11 through 13 may also be performed after the light guide substrate 2 and actuator substrate 4 have been aligned and joined with the spacer 3 interposed.

Meanwhile, the actuator substrate 4 and relay substrate 5 are respectively prepared, and these parts are assembled into the state of the assembly shown in FIG. 12. Specifically, the actuator substrate 4 and relay substrate 5 are joined by means of a bonding agent, etc., the pads 40 and 42 are connected to each other by bonding wires 43 consisting of metal wires, etc., using a wire bonding method, and the temporary lead terminals 45 are connected to the wiring patterns 44. In the state of the assembly shown in FIG. 12, signals are supplied to the actuator substrate 4 via the relay substrate 5, the operation of the actuator substrate 4 is checked, and the actuator substrate 4 is inspected. In this case, if the actuator substrate 4 is defective, this actuator substrate 4 can be discarded without being attached to the light guide substrate 2. It is also possible to employ a construction in which the pads on the actuator substrate 4 are directly connected to the external connection lead terminals 6 on the substrate 1 without installing a relay substrate 5. In such a case, however, since it is difficult to inspect the actuator substrate 4 alone, the pass/fail status of the actuator substrate can only be checked in the stage in which the light beam switching and adjustment device has finally been completed. In this case, if the actuator substrate 4 is defective, the entire light beam switching and adjustment device must be discarded; this results in increased waste both in terms of parts and in terms of the effort required in manufacture, so that an increase in cost is inevitable.

Next, the spacer 3 is joined to the light guide substrate 2 in an airtight manner by means of a bonding agent or soldering, etc. Instead, it would also be possible to join the spacer 3 to the actuator substrate 4.

Subsequently, the actuator substrate 4 in the assembly shown in FIG. 12 is aligned with the light guide substrate 2, and the actuator substrate 4 and spacer 3 are joined in an airtight manner by means of a bonding agent or soldering, etc. In cases where the spacer 3 is joined to the actuator substrate 4 beforehand, the spacer 3 and light guide substrate 2 may simply be joined.

Figure 14:
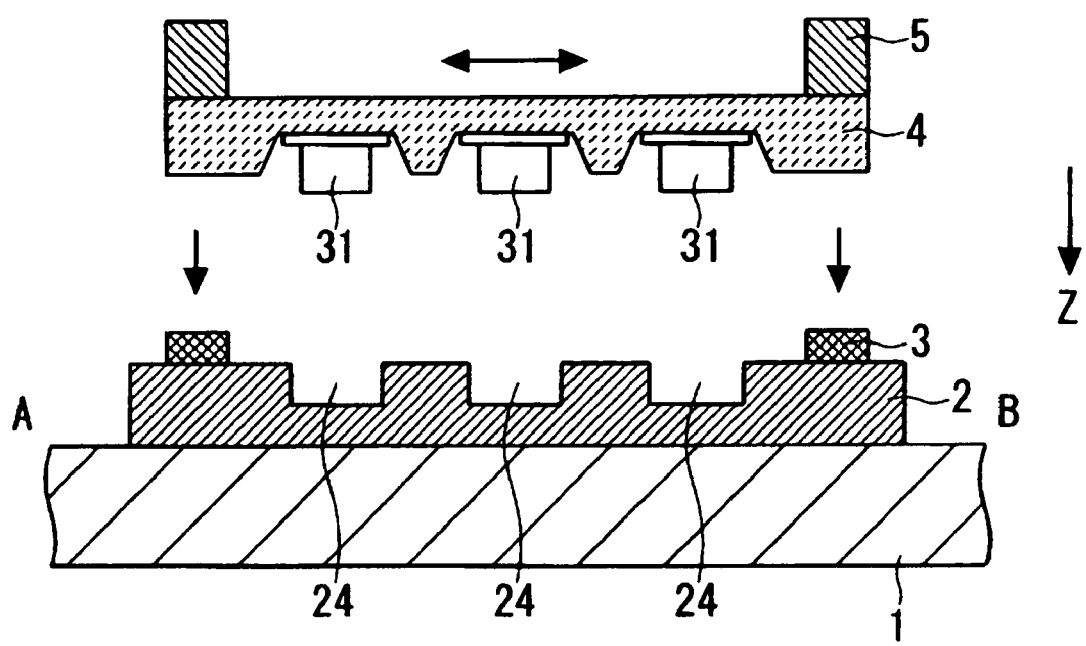
FIG. 14 is a schematic sectional view which illustrates the alignment of the actuator substrate and light guide substrate in model form.

The conditions of this alignment are shown in FIG. 14. FIG. 14 is a schematic sectional view which shows (in model form) the conditions of the alignment of the actuator substrate 4 and the light guide substrate 2; this figure corresponds to FIGS. 2 and 3. This alignment is performed in a state in which all of the mirrors 31 are drawn in toward the substrate 4 as a result of the specified signals described above being supplied to the lead terminals 45 in the assembly shown in FIG. 12 from a voltage application circuit 51 via lead wires 52 as shown in FIG. 13. FIG. 13 shows diagrams which illustrate the conditions of voltage application to the assembly shown in FIG. 12; FIG. 13(a) is a schematic plan view as seen from the +Z side, and FIG. 13(b) is an arrow view along line Y5–Y6 in FIG. 13(a). Since alignment is performed in a state in which all of the mirrors 31 are drawn in toward the substrate 4, even if the actuator substrate 4 is lowered downward in FIG. 14 in a state in which the position of the actuator substrate 4 in the left-right direction in FIG. 14 is shifted, the system will be regulated in a state in which the actuator substrate 4 contacts the spacer 3 before the mirrors 31 strike portions other than the grooves 24 in the light guide substrate 2 (this is also seen from FIG. 3). In particular, this effect is ensured by the disposition of the spacer 3 so that this spacer 3 surrounds the region in which the mirrors 31 are distributed on the actuator substrate 4 as shown in FIG. 11. As a result, a situation can be prevented in which the mirrors 31 collide with other locations and are damaged; therefore, the manufacturing yield is improved. Such a complete damage preventing effect that prevents damage to the mirrors 31 during this alignment is obtained both as a result of the fact that all of the mirrors 31 are in a state in which the mirrors are drawn in toward the substrate 4 during alignment, and as a result of the fact that the spacer 3 is interposed. However, even if only one of these two means is used, damage to the mirrors 31 is far less likely than in cases where neither of these means is used.

Since the number of terminals used in order to place all of the mirrors 31 in a state in which the mirrors are drawn in toward the substrate 4 is only six terminals (as was described above), the number of temporary lead terminals 45 required is also only six terminals; accordingly, the size of the relay substrate 5 can be reduced while maintaining the disposition pitch of the lead terminals 45 at a pitch that allows easy electrical wiring with respect to the voltage application circuit 51. The size and cost of the light beam switching and adjustment device can therefore be reduced. For example, in cases where the circuit construction described above in which the NOR gates NV1 through NV3 and NH1 through NH3 and the terminals V1 and H1 are removed is employed, 16 lead terminals 45 must be lined up side by side in the example described above in which the number of mirrors 31 is 64 64. As a result, the relay substrate 5 must be made fairly large, so that an increase in the size and cost of the light beam switching and adjustment device is unavoidable. Furthermore, the pads 42 can generally be manufactured with a narrower pitch than the lead terminals 45.

Furthermore, the alignment of the actuator substrate 4 and light guide substrate 2 is performed while the alignment marks 26 and 39 respectively formed on the light guide substrate 2 and actuator substrate 4 are observed by means of infrared light. For example, the alignment marks 26 and 39 are observed through the actuator substrate 4 using an infrared microscope, and the movement of the actuator substrate 4 in the lateral direction to a position where the marks 26 and 39 are completely superimposed, and the movement of the actuator substrate 4 toward the light guide substrate 2, are simultaneously or alternately repeated so that the alignment marks 26 and 39 are aligned. Then, the actuator substrate 4 is caused to contact the spacer 3, and the actuator substrate 4 is joined to the spacer 3 by means of a bonding agent, etc. Thus, since this alignment is performed using the alignment marks 26 and 39, the alignment is easy, and this alignment can be performed with good precision.

Furthermore, in the present embodiment, since the alignment marks 26 and 39 are formed on the mutually facing surfaces of the light guide substrate 2 and actuator substrate 4, the distance between the alignment marks 26 and 39 is reduced compared to a case in which one or both sets of alignment marks are formed on the surfaces located on the opposite sides. Accordingly, alignment can be performed with higher precision. Even if such a disposition of the alignment marks 26 and 39 is used, there is no obstacle to the observation of the alignment marks since the actuator substrate 4 has the characteristic of transmitting infrared light, and since the relay substrate 5 that does not transmit infrared light is disposed so that this relay substrate 5 does not cover the locations of the alignment marks 39.

After the actuator substrate 4 and spacer 3 have thus been joined with all of the mirrors 31 placed in a state in which the mirrors are drawn in toward the substrate 4, the output voltage of the voltage application circuit 51 is varied so that all of the mirrors 31 are placed in a state in which the mirrors protrude from the substrate 4. If the terminal C1 in FIG. 10 is set at a low level, and the terminal C2 is then set at a high level via the corresponding lead terminals 45, the voltages of all of the capacitors Cmn are discharged, so that the electrostatic force is eliminated; accordingly, a state results in which all of the mirrors 31 are caused to protrude from the substrate 4 by the spring force of the actuators 32. As a result, all of the mirrors 31 are accommodated in the grooves 24 of the light guide substrate 2. When the mirrors 31 are thus caused to return to a state in which the mirrors protrude from the substrate 4, it is desirable that the mirrors 31 be gradually returned from a state in which the mirrors are drawn in toward the substrate 4.

The reason for that is as follows: specifically, in cases where the alignment described above is incomplete so that the mirrors 31 are shifted from the grooves 24, there is a danger that the mirrors 31 will be damaged if the mirrors 31 are abruptly returned to a state in which the mirrors protrude from the substrate 4, i.e.,if the discharge of the voltages of the capacitors Cmn is abruptly performed. The mirrors 31 can be gradually returned from a state in which the mirrors are drawn in toward the substrate 4 to a state in which the mirrors protrude from the substrate 4, for example, by gradually lowering the clamping voltage VC that is supplied by the voltage application circuit 51.

Subsequently, all of the lead terminals 45 are cut along the end edge of the relay substrate 5 using a cutting tool or the like. The reason for this is that it is no longer necessary to supply signals from the voltage application circuit 51.

Next, a refractive index adjusting liquid 30 is injected into the space between the light guide substrate 2 and actuator substrate 4 via an injection port (not shown in the figures) formed beforehand in the light guide substrate 2, actuator substrate 4 or spacer 3. Following this injection, the injection port is sealed. When this refractive index adjusting liquid 30 is injected, the fluid pressure created by the injection pressure acts on the mirrors 31. However, since the injection of the refractive index adjusting liquid 30 is performed in a state in which the mirrors 31 have protruded from the substrate 4 and advanced into the grooves 24, the fluid pressure to which the mirrors 31 are subjected is small, so that there is no danger that the mirrors 31 will be damaged. If the refractive index adjusting liquid 30 is injected in a state in which the mirrors 31 are drawn in toward the substrate 4 and retracted from the grooves 24, the fluid pressure to which the mirrors 31 are subjected is large, so that there is a danger that the mirrors 31 will be damaged unless the injection pressure of the refractive index adjusting liquid 30 is lowered.

Next, the pads 46 on the relay substrate 5 and the external connection lead terminals 6 on the substrate 1 are connected by bonding wires 47 consisting of metal wires, etc., using a wire bonding method. As a result, the assembly in the state shown in FIG. 1 is completed.

Subsequently, processes which complete the package and the like are performed as required, thus completing the light beam switching and adjustment device of the present embodiment.

A light beam switching and adjustment device and a method for manufacturing the same constituting embodiments of the present invention were described above. However, the present invention is not limited to these embodiments.

For example, in the embodiment described above, a structure in which both sides of each movable plate 33 were supported by flexure parts 34a and 34b was used as the structure of the actuators 32; however, for example, it would also be possible to employ a structure utilizing a cantilever.

Figure 15:
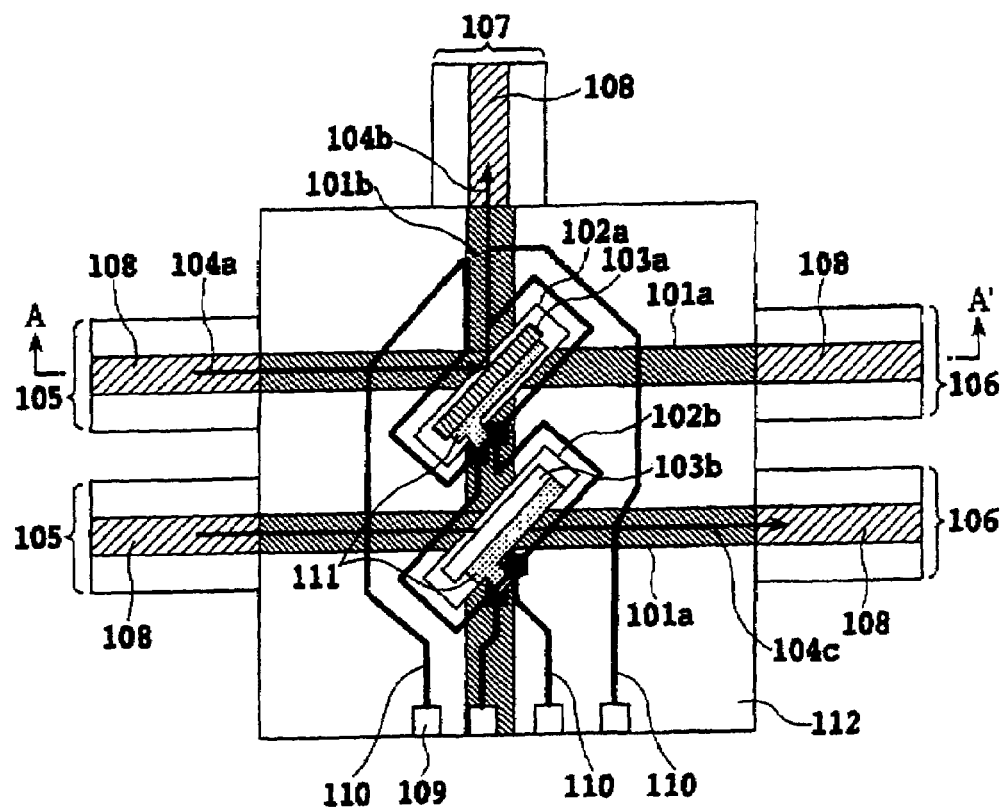
FIG. 15 shows diagrams which are used to illustrate an example of the construction of the light beam switching and adjustment device of the present invention.
Figure 15:
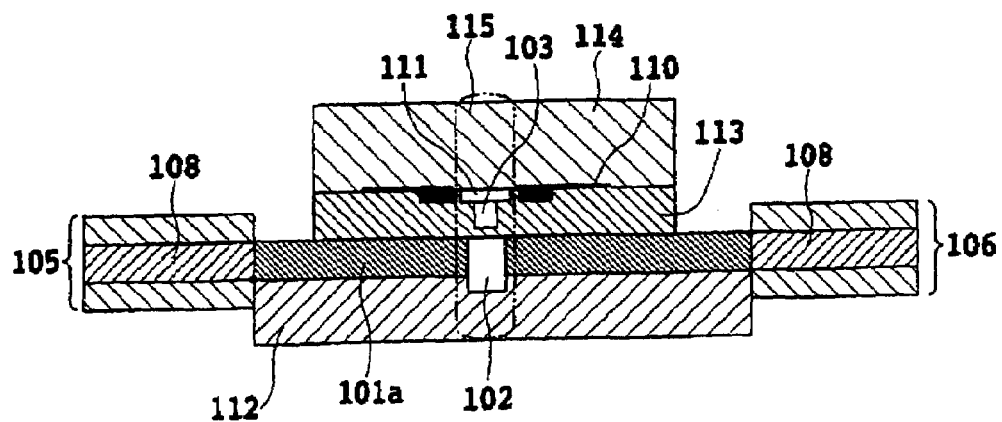

FIG. 15 shows diagrams which are used to illustrate an example of the construction of the light beam switching and adjustment device of the present invention; FIG. 15(*a*) is a plan view of this device, and FIG. 15(*b*) is a sectional view along line A–A' in FIG. 15(*a*). Furthermore, in FIGS. 15 through 17, the same constituent elements are labeled with the same symbols, and a description in each figure may be omitted.

As is shown in FIG. 15(*a*), this light beam switching and adjustment device comprises first and second light guide cores 101 (101a and 101b) on a core supporting substrate 112. The end portions of the first light guide cores 101a are connected to incident-side optical fibers 105 and transmission-side optical fibers 106, and one end of the second light guide core 101b is connected to a reflection-side optical fiber 107. Furthermore, slits 102 (102a and 102b) are formed so that these slits cut across the light guides in the intersection parts of the light guide cores. Furthermore, in FIG. 15(*a*), the insertion plate driving mechanism accommodating part 113 and insertion plate driving mechanism supporting substrate 114 are omitted.

Furthermore, as is shown in FIG. 15(*b*), an insertion plate driving mechanism supporting substrate 114 is disposed on the upper surface region of the core supporting substrate 112 with an insertion plate driving mechanism accommodating part 113 interposed. The insertion plates 103 (103a and 103b) are supported by insertion plate driving mechanisms 111 which are supported on this insertion plate driving mechanism supporting substrate 114. Insertion plate driving wiring 110 which is connected to wiring terminals 109 disposed on the side surface part of the core supporting substrate 112 is formed on the insertion plate driving mechanism supporting substrate 114, and the insertion plates 103 that are disposed facing the upper parts of the slits 102 are driven upward and downward by the insertion plate driving mechanisms 111 (which are operated by an electromagnetic force or electrostatic force) so that these insertion plates 103 are inserted into or withdrawn from the slits 102, thus making it possible to perform a switching operation by switching the light paths of the light beams that are incident from the optical fiber core parts 108, or an attenuation operation by adjusting the amount of light that is transmitted.

Specifically, as is shown in FIG. 15(*a*), in a state in which the insertion plate 103b is withdrawn from the slit 102b, for example, the incident light beam 104a that enters the slit 102b from the first light guide core 101a coupled to the incident-side optical fiber 105 is coupled "as is" with the end surface of the facing light guide core 101a to form a transmitted light beam 104c. On the other hand, in a state in which the insertion plate 103a is inserted into the slit 102a, the incident light beam 104a is reflected by the insertion plate 103a, thus forming a reflected light beam 104b; this light beam is coupled with the end surface of the light guide core 101b, so that the light path of the light beam is switched, thus realizing a switching operation. Furthermore, an attenuation operation that attenuates the intensity of the transmitted light can also be realized by adjusting the insertion positions (insertion depths) of the insertion plates 103 inside the slits 102.

Ordinarily, in a light beam switching and adjustment device, the insertion plate driving wiring is formed as metal wiring, and this metal wiring presents an obstacle to microscopic observation of the insertion positions (insertion depths) of the insertion plates inside the slits. In particular, observation is extremely difficult in cases where the metal wiring is disposed in the vicinity of the slits and insertion plates. Accordingly, in the light beam switching and adjustment device of the present invention, the system is devised with the insertion plate driving wiring 110 disposed around the peripheries of the insertion plates 103 instead of in the vicinity of the insertion plates 103, so that observation of the in-plane positional relationship between the slits 102 and insertion plates 103 in the plane parallel to the plane of the core supporting substrate 112 is facilitated.

Specifically, as is shown in FIG. 15(*a*), the insertion plate driving wiring 110 is wired so that the positions of the slits 102 and insertion plates 103 are avoided, thus devising the system so that there is no obstacle to observation of the in-plane positional relationship between the slits 102 and insertion plates 103 from the normal direction of the surface of the core supporting substrate 112, which is the ordinary direction of observation. Furthermore, in this light beam switching and adjustment device, the region 115 that includes the slits 102 and insertion plates 103 shown in FIG. 15(*b*) is formed from a material that transmits the light used in microscopic observation, and the shape of this region 115 is also formed as a shape that does not block observation, in order to allow observation from the normal direction of the surface of the core supporting substrate 112.

The device construction shown in FIG. 15 is an example of the construction used in a case in which observation is performed with the observation light transmitted through the core supporting substrate 112 and insertion plate driving mechanism supporting substrate 114. However, in the case of a device in which light is caused to be incident from the side of the core supporting substrate 112, and observation of the positions is performed from the reflected images of this light, a material and a shape that are transparent to the observation light may be used for the region that includes the slits 102 of the core supporting substrate 112. Furthermore, in cases where light is caused to be incident from the side of the insertion plate driving mechanism supporting substrate 114, and the reflected light is observed, a construction may be used in which the region in the vicinity of the insertion plates 103 of the insertion plate driving mechanism supporting substrate 114 is transparent to the observation light.

An outline of the manufacturing process of the light beam switching and adjustment device of the present invention is as follows:

In such a light beam switching and adjustment device, it is necessary to suppress the light loss of the transmitted light beams and reflected light beams in the slits with respect to the incident light beams to an extremely small value. For example, in order to lower the light loss in the slits to approximately 0.5 dB or less, it is desirable to set the slit width at 10 $\mu$m or less. Accordingly, in the light beam switching and adjustment device of the present invention as well, in cases where light guide cores and slits that have a width of 10 $\mu$m or less are formed, a so-called "PLC (planar light wave circuit)" technique is employed in which quartz is deposited on the surface of a silicon substrate, and this quartz is then etched. Furthermore, besides a silicon substrate, a glass substrate or the like may also be used as the core supporting substrate of the light beam switching and adjustment device of the present invention.

In cases where the light beam switching and adjustment device of the present invention is used only as a variable attenuation device which varies the intensity of the transmitted light beams by controlling the positions of the insertion plates inside the slits, it is not necessary to endow the device with the switching operation function (among the functions describe above). In this case, the formation of mutually crossing light guide cores as shown in FIG. 15 is unnecessary, and it is also unnecessary to use a PLC technique for the formation of the light guide cores. In such a case, a glass substrate in which the positions of the optical fibers can be designated by the formation of V grooves or the like may be used, and the optical fiber core parts may be used as light guide cores, and a glass substrate as the core supporting substrate, by forming slits in the optical fibers that are bonded and fastened to this substrate.

Meanwhile, the insertion plates are formed on a silicon substrate using MEMS technology, this silicon substrate is used as the insertion plate driving mechanism supporting substrate, and the device is completed as a light beam switching device by bonding these parts after optimizing the in-plane positional relationship between the slits and the insertion plates by means of alignment marks disposed beforehand. Furthermore, the present invention, which allows monitoring from the outside, is also effective in cases where the state of alignment between the insertion plates and the slits is finely adjusted before bonding is completed.

In order to confirm the effects of the construction used in this light beam switching device of the present invention, a light beam switching and adjustment device was manufactured by respectively forming light guide cores and insertion plates on a core supporting substrate and an insertion plate driving mechanism supporting substrate consisting of silicon substrates, and forming aluminum insertion plate driving wiring on the surface of the insertion plate driving mechanism supporting substrate in a pattern that avoided wiring in the vicinity of the insertion plates and slits. Infrared light was transmitted from the core supporting substrate side of this light beam switching and adjustment device, and the transmitted light was observed by means of an infrared microscope from the side of the insertion plate driving mechanism supporting substrate. As a result, the in-plane positional relationship between the insertion plates and slits was clearly observed without any blocking of the infrared light by the insertion plate driving wiring or the like.

Furthermore, the in-plane positional relationship between the insertion plates and the slits was clearly observed both in a case in which infrared light was caused to be incident from the side of the insertion plate driving mechanism supporting substrate and the reflected images of this light were observed, and a case in which infrared light was caused to be incident from the side of the core supporting substrate and the reflected images of this light were observed from the side of the core supporting substrate.

Furthermore, the in-plane positional relationship between the insertion plates and the slits was clearly observed from the side of the core supporting substrate in a variable attenuation device in which a glass substrate was used as the core supporting substrate, and the light guide cores of optical fiber core parts were formed on top of this substrate.

The positional observations described above relate to the relative positions of the insertion plates and slits in the plane parallel to the surface of the core supporting substrate. In the case of such planar observations, even if it is assumed that the focal point of the microscope is successfully adjusted to the insertion plates, the depth of field is shallow when the magnification of the microscope is high; as a result, the positions of the insertion plates in the direction of depth inside the slits is usually unclear, so that the positions of the insertion plates in the direction of depth inside the slits is difficult to ascertain. In order to simultaneously obtain positional information for the insertion plates in the direction of depth inside the slits in addition to in-plane positional relationship information, it is effective to provide depth detection markers on the insertion plates of the light beam switching and adjustment device of the present invention. The depth positions of the insertion plate can be observed by adjusting the focal point of the microscope to these markers.

Figure 16:
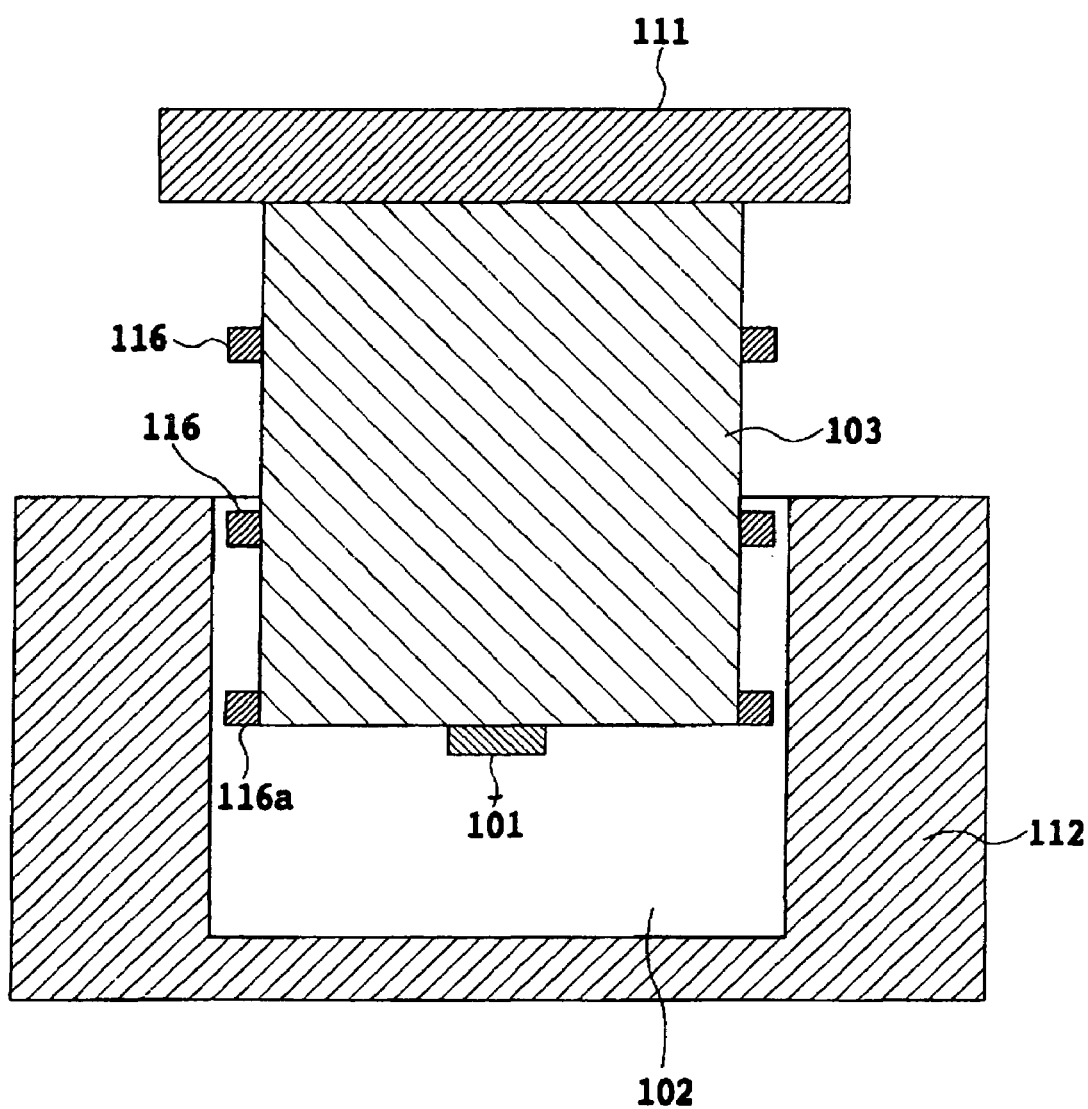
FIG. 16 is a diagram which is used to illustrate the conditions in the vicinity of the slits and insertion plates in the light beam switching and adjustment device of the present invention with a construction in which depth detection markers are disposed on the insertion plates.
Figure 17:
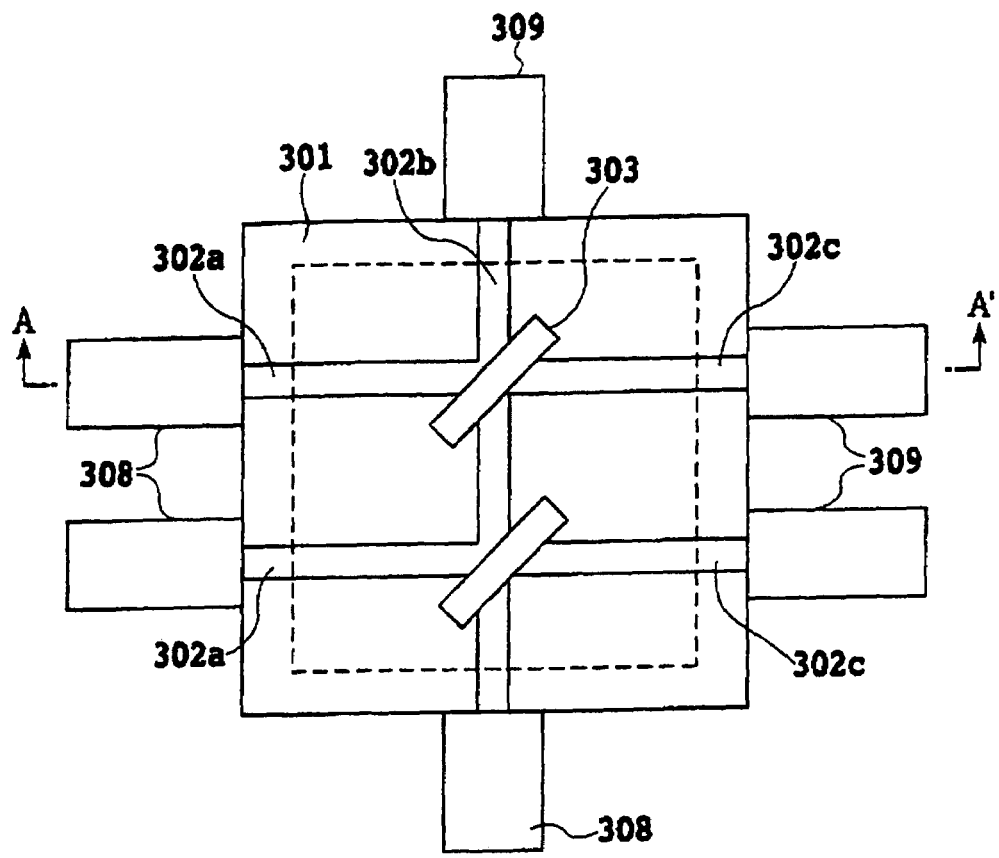
FIG. 17 shows diagrams which are used to illustrate an example of construction of a conventional light beam switching and adjustment device using MEMS technology.
Figure 17:
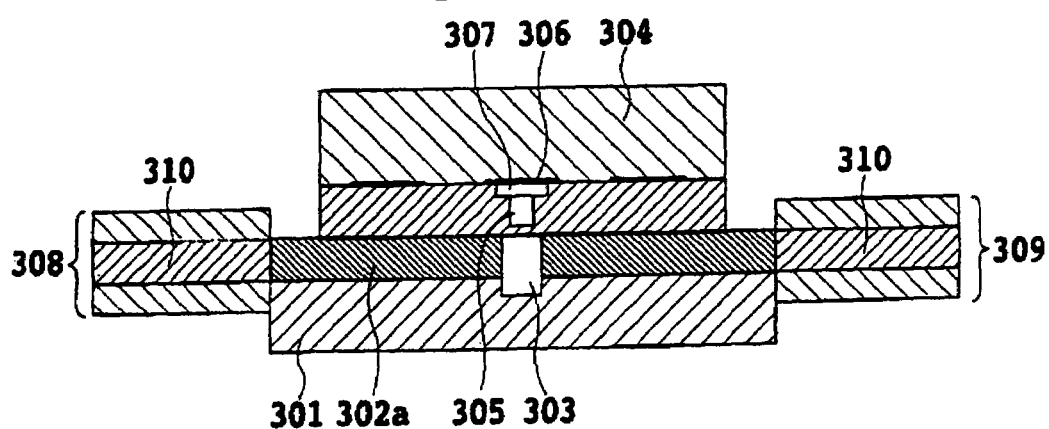

FIG. 16 is a diagram which is used to illustrate the conditions in the vicinity of the slits 102 and insertion plates 103 of the light beam switching device of the present invention with a construction in which projection-form depth detection markers 116 are disposed in appropriate positions on the insertion plates 103. A total of six depth detection markers 116, i.e., three markers each on the left and right, are disposed on the insertion plate 103 shown in this figure. Furthermore, the construction shown in this figure is such that the depth detection markers 116 are disposed on the insertion plates 103; however, it would also be possible to use a construction in which markers are formed on both the insertion plates 103 and the light guide cores 101. If such a construction is used, the relationship of the positions of the insertion plates 103 and slits 102 in the direction of depth can be more easily observed; furthermore, the degree of tilting of the insertion plates 103 inside the slits 102 can be determined from the overlapping of the markers by setting the observation conditions so that the direction of extension of the insertion plates 103 coincides with the direction of position observation. Furthermore, the shape of the markers is not limited to projections; these markers may be indented or projecting parts (varying parts) such as indentations, and it is sufficient if at least one such marker is disposed on each insertion plate 103.

Furthermore, if the projecting parts of the depth detection markers are attached to the tip end portions of the insertion plates 103 as shown (for example) by 116a, this is convenient for observing the positional relationship of the slits 102 and insertion plates 103 from the side of the core supporting substrate 112 following bonding, and is also effective in the fine adjustment of bonding.

In order to confirm the effect of disposing such markers, the conditions of insertion of the insertion plates 103 into the slits 102 were observed using a light beam switching and adjustment device with a construction in which the projections shown in FIG. 16 were used as markers. As a result, when the positions of the projections were read from the depth scale of the microscope using the depths of the cores 101 as a reference, it was possible to detect the positions of the insertion plates 103 with a precision of 3 $\mu$m or better. Furthermore, when observations were performed with the projections overlapping each other, it was confirmed that there was almost no tilting of the insertion plates in the direction of observation. Moreover, when observations were not performed with the projections overlapping each other, it was possible to determine the tilting of the insertion plates by calculation from the shift in the positions of the respective projections in the horizontal direction and the distance between the projections at the time of manufacture of the insertion plates.

INDUSTRIAL APPLICABILITY

For example, the light beam switching and adjustment device of the present invention can be utilized to perform the light path switching of light beams and adjustment of the amount of transmitted light in optical communication systems.

What is claimed is:

1. A light beam switching and adjustment device comprising:
   (i) a light guide substrate which comprises:
      at least one input port,
      a plurality of output ports,
      at least one mirror receiving recess formed in one surface of the light guide substrate, and
      a plurality of light guides that conduct light input into the at least one input port to a selected at least one output port of the plurality of output ports; and
   (ii) an actuator substrate which comprises:
      at least one mirror which is adapted to advance into and retract from a corresponding one said at least one mirror recess, and
      at least one actuator disposed in a position corresponding to a corresponding one said at least one mirror to support the corresponding mirror,
      wherein the at least one actuator is operable to position the corresponding mirror in a first position in which the mirror is advanced into the corresponding mirror receiving recess and in a second position, which is closer to a first surface of the actuator substrate than the first position, in which the mirror is retracted from the corresponding mirror receiving recess, and
      wherein the plurality of light guides conduct the light to the selected at least one output port in accordance with selective advancement and retraction of the at least one mirror with respect to the corresponding mirror receiving recess;
   (iii) first alignment marks on the light guide substrate; and
   (iv) second alignment marks on the actuator substrate;
      wherein when the first alignment marks are aligned with the second alignment marks, the light guide substrate and the actuator substrate are aligned such that the at least one mirror is aligned with the corresponding at least one mirror receiving recess such that each said at least one mirror is able to advance into and retract from the corresponding one said at least one mirror recess.

2. The light beam switching and adjustment device according to claim 1, wherein the first and second alignment marks are observable via infrared light.

3. The light beam switching and adjustment device according to claim 1, wherein the first alignment marks are formed on said surface of the light guide substrate, the second alignment marks are formed on said first surface of the actuator substrate, and the actuator substrate permits transmission of infrared light therethrough.

4. The light beam switching and adjustment device according to claim 1, wherein supply of electric power to the actuator substrate is performed directly to the actuator substrate from outside.

5. The light beam switching and adjustment device according to claim 1, wherein the at least one mirror comprises a plurality of mirrors, the at least one mirror receiving recess comprises a plurality of mirror receiving recesses respectively corresponding to the plurality of mirrors, and the at least one actuator comprises a plurality of actuators respectively corresponding to the plurality of mirrors; and
   wherein the actuator substrate further comprises a plurality of feed terminals for use in electrically driving the actuators, said plurality of feed terminals including: at least one feed terminal of a first type to perform feeding for individually driving a corresponding one of the actuators, and at least one feed terminal of a second type used to perform feeding for collectively driving all of the actuators to position all of the mirrors in the second position.

6. The light beam switching and adjustment device according to claim 5, further comprising a driving circuit mounted on the actuator substrate for driving the actuators to perform optical switching operations in accordance with signals supplied to the terminals of the first type, and to position the mirrors in the second position when predetermined signals are supplied to the terminal of the second type.

7. The light beam switching and adjustment device according to claim 5, wherein each of the mirrors comprises at least one concavo-convex portion, and an insertion depth of said each of the mirrors in the corresponding mirror receiving recesses is observable by using the concavo-convex portion as a focusing reference for microscopic observation.

8. The light beam switching and adjustment device according to claim 1, wherein the light guide substrate and the actuator substrate are joined with a spacer interposed therebetween to separate the light guide substrate and the actuator substrate by a thickness of the spacer, such that the at least one mirror is completely retracted from the corresponding mirror receiving recess when in the second position.

9. The light beam switching and adjustment device according to claim 8, wherein the spacer is positioned to surround a region of the actuator substrate in which the at least one mirror is provided.

10. The light beam switching and adjustment device according to claim 9, wherein a space between the light guide substrate and actuator substrate is filled with a refractive index adjusting liquid such that the refractive index adjusting liquid enters the at least one mirror receiving recess, said refractive index adjusting liquid having a refractive index that is substantially the same as a refractive index of core layers of the light guides; and
    wherein the spacer forms a part of a sealing structure that contains the refractive index adjusting liquid.

11. The light beam switching and adjustment device according to claim 1, further comprising a relay substrate which relays electrical connections to the actuator substrate;
    wherein the relay substrate is joined to a second surface of the actuator substrate such that a portion of the relay substrate protrudes from the actuator substrate.

12. The light beam switching and adjustment device according to claim 11, further comprising:
    a plurality of first pads for electrical connections formed on the first surface of the actuator substrate;
    a plurality of second pads for electrical connections formed on a surface of the relay substrate adjacent to the actuator substrate and on the portion of the relay substrate that protrudes from the actuator substrate; and
    a plurality of third pads for electrical connections formed on the relay substrate, each of the third pads being electrically connected to one of the plurality of second pads;
    wherein the plurality of first pads and plurality of second pads are respectively electrically connected to each other by bonding wires.

13. The light beam switching and adjustment device according to claim 12, further comprising a substrate which includes a plurality of lead terminals for external connections;
    wherein the plurality of third pads and the plurality of lead terminals respectively electrically connected to each other by bonding wires.

14. The light beam switching and adjustment device according to claim 12, further comprising a plurality of conductive parts which are formed on the relay substrate and which are respectively electrically connected to a plurality of the plurality of second pads;
    wherein a disposition pitch of at least a part of each of the plurality of conductive parts is wider than a disposition pitch of the plurality of second pads and a disposition pitch of the plurality of third pads.

15. The light beam switching and adjustment device according to claim 14, wherein the plurality of conductive parts are formed on the surface of the relay substrate adjacent to the actuator substrate and on the portion of the relay substrate that protrudes from the actuator substrate; and
    wherein the plurality of third pads are formed on a surface of the relay substrate on an opposite side of the relay substrate with respect to the actuator substrate.

16. The light beam switching and adjustment device according to claim 14, each said at least one are positioned by the corresponding actuator in the second position when specified signals are respectively supplied to the plurality of conductive parts.

17. The light beam switching and adjustment device according to claim 14, further comprising a driving circuit mounted on the actuator substrate for driving the actuators to perform optical switching operations in accordance with signals supplied to the plurality of third pads, to position the at least one mirror in the second position when predetermined signals are supplied to the plurality of conductive parts.

18. A method for manufacturing a light beam switching and adjustment device, said method comprising:
    (i) preparing a light guide substrate which comprises:
        at least one input port,
        a plurality of output ports,
        at least one mirror receiving recess formed in one surface of the light guide substrate,
        a plurality of light guides that conduct light input into the at least one input port to a selected at least one output port of the plurality of output ports, and
        first alignment marks;
    (ii) preparing an actuator substrate which comprises:
        at least one mirror which is adapted to advance into and retract from a corresponding one said at least one mirror recess,
        at least one actuator disposed in a position corresponding to a corresponding one said at least one mirror to support the corresponding mirror, and
        second alignment marks,
        wherein the at least one actuator is operable to position the corresponding mirror in a first position in which the mirror is advanced into the corresponding mirror receiving recess and in a second position, which is closer to a surface of the actuator substrate than the first position, in which the mirror is retracted from the corresponding mirror receiving recess, and
        wherein the plurality of light guides conduct the light to the selected at least one output port in accordance with selective advancement and retraction of the at least one mirror with respect to the corresponding mirror receiving recess; and
    (iii) aligning and joining the light guide substrate and the actuator substrate using the first and second alignment marks to align the first and second alignment marks;
    wherein when the first alignment marks are aligned with the second alignment marks, the light guide substrate and the actuator substrate are aligned such that the at least one mirror is aligned with the corresponding at least one mirror receiving recess such that each said at least one mirror is able to advance into and retract from the corresponding one said at least one mirror recess.

19. The method for manufacturing a light beam switching and adjustment device according to claim 18, further comprising:
    preparing a spacer to be joined between the light guide substrate and the actuator substrate; and
    joining the spacer to one of the light guide substrate and the actuator substrate, before the light guide substrate and the actuator substrate are aligned and joined;
    wherein when the spacer is joined between the light guide substrate and the actuator substrate, the spacer separates the light guide substrate and the actuator substrate such that the at least one mirror is completely retracted from the corresponding mirror receiving recess when in the second position.

20. The method for manufacturing a light beam switching and adjustment device according to claims 18, wherein the at least one actuator is constructed so that when no signals are supplied, the corresponding mirror supported on the actuator returns to a predetermined position that is farther from the surface of the actuator substrate than the second position; and wherein while aligning the light guide substrate and the actuator substrate, signals are applied to the actuator substrate to position the at least one mirror in the second position.

21. The method for manufacturing a light beam switching and adjustment device according to claim 20, wherein signals are supplied to the actuator substrate to cause the at least one mirror to gradually return to the predetermined position after completion of the alignment between the light guide substrate and the actuator substrate.

22. A light beam switching and adjustment device comprising:
(i) a light guide substrate which comprises:
at least one input port,
a plurality of output ports,
at least one mirror receiving recess formed in one surface of the light guide substrate, and
a plurality of light guides that conduct light input into the at least one input port to a selected at least one output port of the plurality of output ports; and
(ii) an actuator substrate which comprises:
at least one mirror which is adapted to advance into and retract from a corresponding one said at least one mirror recess, and
at least one actuator disposed in a position corresponding to a corresponding one said at least one mirror to support the corresponding mirror,
wherein the at least one actuator is operable to position the corresponding mirror in a first position in which the mirror is advanced into the corresponding mirror receiving recess and in a second position, which is closer to a surface of the actuator substrate than the first position, in which the mirror is retracted from the corresponding mirror receiving recess, and
wherein the plurality of light guides conduct the light to the selected at least one output port in accordance with selective advancement and retraction of the at least one mirror with respect to the corresponding mirror receiving recess;
(iii) first alignment marks formed on the light guide substrate for use in aligning the light guide substrate and the actuator substrate; and
(iv) second alignment marks on the actuator substrate for use in aligning the light guide substrate and the actuator substrate;
wherein the first alignment marks are formed on said surface of the light guide substrate, the second alignment marks are formed on said surface of the actuator substrate, and the actuator substrate permits transmission of infrared light therethrough.

* * * * *